US012601953B2

(12) United States Patent
 Iwasa

(10) Patent No.: US 12,601,953 B2
(45) Date of Patent: Apr. 14, 2026

(54) OPTICAL NODE DEVICE EMPLOYING INDEPENDENTLY OPERABLE ELEMENTS

(71) Applicant: JVCKENWOOD Corporation, Yokohama (JP)

(72) Inventor: Takayuki Iwasa, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/175,560

(22) Filed: Feb. 28, 2023

(65) Prior Publication Data

US 2023/0205045 A1    Jun. 29, 2023

Related U.S. Application Data

(63) Continuation of application No. PCT/JP2021/032541, filed on Sep. 3, 2021.

(30) Foreign Application Priority Data

Sep. 16, 2020    (JP) ................................ 2020-155779
Sep. 16, 2020    (JP) ................................ 2020-155780
Sep. 16, 2020    (JP) ................................ 2020-155873

(51) Int. Cl.
 *G02F 1/31*          (2006.01)
 *G09G 3/36*          (2006.01)
(52) U.S. Cl.
 CPC ............. *G02F 1/31* (2013.01); *G09G 3/3614* (2013.01); *G02F 2203/02* (2013.01);
 (Continued)
(58) Field of Classification Search
 CPC ...................... G02F 1/133553; G02F 2203/02
 See application file for complete search history.

(56) References Cited

U.S. PATENT DOCUMENTS 5,404,030 A    *    4/1995    Kim ................... H10D 30/6731
                                                            257/E29.279
8,305,313 B2    11/2012    Furuya
                  (Continued)

FOREIGN PATENT DOCUMENTS

JP          2009-223289          10/2009
JP          2012-113072          6/2012
                  (Continued)

OTHER PUBLICATIONS

International Search Report and Written Opinion for International Application No. PCT/JP2021/032541 mailed on Nov. 22, 2021, 9 pages.

*Primary Examiner* — Lauren Nguyen
(74) *Attorney, Agent, or Firm* — Amin, Turocy & Watson, LLP

(57)          ABSTRACT

An optical node device including a liquid crystal display device with pixels having a first transistor between a positive-polarity pixel data line and a first holding capacitor with a gate for a row scan signal, a second transistor between a negative-polarity pixel data line and a second holding capacitor with a gate for the row scan signal, a fifth transistor between a pixel electrode and a first source follower circuit where a voltage from the first holding capacitor is input with a gate for a first control signal, and a sixth transistor between the pixel electrode and a second source follower circuit where a voltage from the second holding capacitor is input with a gate for a second control signal turned on alternately with the first control signal. The fifth and sixth transistors have a threshold voltage different from that of other transistors of a first conductivity type.

5 Claims, 22 Drawing Sheets

(52) U.S. Cl.
　　　CPC ............... *G09G 2300/0819* (2013.01); *G09G*
　　　　　　　　*2300/0852* (2013.01); *G09G 2310/0202*
　　　　　　　　　　　　　　　　　　　(2013.01)

(56)　　　　　　　References Cited

U.S. PATENT DOCUMENTS

| | | | | |
|---|---|---|---|---|
| 2009/0035887 | A1* | 2/2009 | Suzuki | .................. H10F 39/805 |
| | | | | 438/57 |
| 2012/0200548 | A1* | 8/2012 | Iwasa | ................... G09G 3/3648 |
| | | | | 345/94 |
| 2015/0188656 | A1* | 7/2015 | Sakurai | .............. H04J 14/0212 |
| | | | | 398/49 |

FOREIGN PATENT DOCUMENTS

| | | |
|---|---|---|
| JP | 5549614 | 7/2014 |
| JP | 2015-156015 | 8/2015 |

* cited by examiner

OPTICAL NODE DEVICE EMPLOYING INDEPENDENTLY OPERABLE ELEMENTS

CROSS-REFERENCE TO RELATED APPLICATIONS

This application is a Continuation of PCT International Application No. PCT/JP2021/032541 filed on Sep. 3, 2021 which claims the benefit of priority from Japanese Patent Application No. 2020-155779 filed on Sep. 16, 2020, Japanese Patent Application No. 2020-155780 filed on Sep. 16, 2020, and Japanese Patent Application No. 2020-155873 filed on Sep. 16, 2020, the entire contents of all of which are incorporated herein by reference.

FIELD OF THE INVENTION

The present application relates to optical node devices.

BACKGROUND OF THE INVENTION

Optical networks are used to support modern demands related to high-speed, high-capacity electric communication. These networks utilize as many optical spectra as possible by using a technique known in general as optical wavelength-division multiplexing (WDM).

In many optical networks, optical node devices for branch points of the optical networks are used. Reconfigurable optical add/drop multiplexer (ROADM) devices having reconfigurable add/drop functions are desirably used in optical node devices in many cases.

To implement a ROADM system, a wavelength selective switch (WSS) may be used for routing of any wavelength channel. In a WSS, an optical beam deflection device such as a spatial light modulator may be used, and a wavelength may be selected for deflection to a desired output port. The WSS that utilizes a spatial light modulator using a reflective liquid crystal display device is in use today (Japanese Patent No. 5549614, Japanese Patent Application Laid-open No. No. 2009-223289).

In the above mentioned WSS that utilizes a spatial light modulator using the reflective liquid crystal display device, a S/N ratio of an optical signal can be improved and a number of channels can be increased by expanding a dynamic range of the reflective liquid crystal display device.

SUMMARY OF THE INVENTION

An optical node device is disclosed.

According to one aspect, there is provided an optical node device, comprising: a liquid crystal display device; an input and output unit having an input port on which incident light is incident and an output port from which output light according to each wavelength included in the incident light is output; a dispersive element configured to spatially disperse light of each wavelength included in the incident light according to the wavelength and output the output light toward the input and output unit; and a lens configured to condenses the light of each wavelength dispersed by the dispersive element onto a surface of the liquid crystal display device per wavelength and output light of each wavelength reflected by the liquid crystal display device toward the dispersive element, wherein the liquid crystal display device has multiple pixels respectively provided at intersections at which multiple pairs of pixel data lines comprising of a positive polarity pixel data line to which a positive polarity pixel signal is supplied and a negative polarity pixel signal is supplied and a negative polarity pixel data line to which a negative polarity pixel signal is supplied and multiple row scan lines to which a row scan signal is supplied intersect, each of the multiple pixels comprising: a display element having a liquid crystal layer held between a pixel electrode and a common electrode that are opposite to each other; a first holding capacitor for holding the positive polarity pixel signal; a first transistor having a source-drain path connected between the positive polarity pixel data line and the first holding capacitor and a gate to which the row scan signal is supplied; a second holding capacitor for holding the negative polarity pixel signal; a second transistor having a source-drain path connected between the negative polarity pixel data line and the second holding capacitor and a gate to which the row scan signal is supplied; a first source follower circuit including a third transistor having a gate to which a voltage from the first holding capacitor is input; a second source follower circuit including a fourth transistor having a gate to which a voltage from the second holding capacitor is input; a fifth transistor having a source-drain path connected between an output terminal of the first source follower circuit and the pixel electrode and a gate to which a first control signal is supplied; and a sixth transistor having a source-drain path connected between an output terminal of the second source follower circuit and the pixel electrode and a gate to which a second control signal that is turned on alternately with the first control signal is supplied, wherein the first transistor, the second transistor, the fifth transistor, and the sixth transistor are transistors of a first conductivity type, the third transistor and the fourth transistor are transistors of a second conductivity type, the fifth transistor and the sixth transistor have a threshold voltage different from a threshold voltage of ordinary transistors of the first conductivity type, and the light of each wavelength condensed by the lens is reflected in a direction determined by routing per wavelength.

According to one aspect, there is provided an optical node device, comprising: a liquid crystal display device; an input and output unit having an input port on which incident light is incident and an output port from which output light according to each wavelength included in the incident light is output; a dispersive element configured to spatially disperse light of each wavelength included in the incident light according to the wavelength and output the output light toward the input and output unit; and a lens configured to condenses the light of each wavelength dispersed by the dispersive element onto a surface of the liquid crystal display device per wavelength and output light of each wavelength reflected by the liquid crystal display device toward the dispersive element, wherein the liquid crystal display device has multiple pixels respectively provided at intersections at which multiple pairs of pixel data lines comprising of a positive polarity pixel data line to which a positive polarity pixel signal is supplied and a negative polarity pixel data line to which a negative polarity pixel signal is supplied and multiple row scan lines to which a row scan signal is supplied intersect, each of the multiple pixels comprising: a display element having a liquid crystal layer held between a pixel electrode (PE) and a common electrode that are opposite to each other; a first holding capacitor for holding the positive polarity pixel signal; a first transistor having a source-drain path connected between the positive polarity pixel data line and the first holding capacitor and a gate to which the row scan signal is supplied; a second holding capacitor for holding the negative polarity pixel signal; a second transistor having a source-drain path connected between the negative polarity pixel data line and the second holding capacitor and a gate to which the row scan signal is supplied; a first source follower circuit including a third transistor having a gate to which a voltage from the first holding capacitor is input; a second source follower circuit including a fourth transistor having a gate to which a voltage from the second holding capacitor is input; a fifth transistor having a source-drain path connected between an output terminal of the first source follower circuit and the pixel electrode and a gate to which a first control signal is supplied; and a sixth transistor having a source-drain path connected between an output terminal of the second source follower circuit and the pixel electrode and a gate to which a second control signal that is turned on alternately with the first control signal is supplied, wherein the first transistor, the second transistor, the fifth transistor, and the sixth transistor are transistors of a first conductivity type, the third transistor and the fourth transistor are transistors of a second conductivity type, the first transistor, the second transistor, the fifth transistor, and the sixth transistor have a threshold voltage different from a threshold voltage of ordinary transistors of the first conductivity type, and the light of each wavelength condensed by the lens is reflected in a direction determined by routing per wavelength.

According to one aspect, there is provided an optical node device, comprising: a liquid crystal display device; an input and output unit having an input port on which incident light is incident and an output port from which output light according to each wavelength included in the incident light is output; a dispersive element configured to spatially disperse light of each wavelength included in the incident light according to the wavelength and output the output light toward the input and output unit; and a lens configured to condenses the light of each wavelength dispersed by the dispersive element onto a surface of the liquid crystal display device per wavelength and output light of each wavelength reflected by the liquid crystal display device toward the dispersive element, wherein the liquid crystal display device has multiple pixels respectively provided at intersections at which multiple pairs of pixel data lines comprising of a positive polarity pixel data line to which a positive polarity pixel signal is supplied and a negative polarity pixel data line to which a negative polarity pixel signal is supplied and multiple row scan lines to which a row scan signal is supplied intersect, each of the multiple pixels comprising: a display element having a liquid crystal layer held between a pixel electrode and a common electrode that are opposite to each other; a first holding capacitor for holding the positive polarity pixel signal; a first transistor having a source-drain path connected between the positive polarity pixel data line and the first holding capacitor and a gate to which the row scan signal is supplied; a second holding capacitor for holding the negative polarity pixel signal; a second transistor having a source-drain path connected between the negative polarity pixel data line and the second holding capacitor and a gate to which the row scan signal is supplied; a first source follower circuit including a third transistor having a gate to which a voltage from the first holding capacitor is input; a second source follower circuit including a fourth transistor having a gate to which a voltage from the second holding capacitor is input; a fifth transistor having a source-drain path connected between an output terminal of the first source follower circuit and the pixel electrode and a gate to which a first control signal is supplied; and a sixth transistor having a source-drain path connected between an output terminal of the second source follower circuit and the pixel electrode and a gate to which a second control signal that is turned on alternately with the first control signal is supplied, wherein the first transistor, the second transistor, the fifth transistor, and the sixth transistor are transistors of a first conductivity type; the third transistor and the fourth transistor are transistors of a second conductivity type, the third transistor and the fourth transistor have a threshold voltage different from a threshold voltage of ordinary transistors of the second conductivity type, the fifth transistor and the sixth transistor have a threshold voltage different from a threshold voltage of ordinary transistors of the first conductivity type, and the light of each wavelength condensed by the lens is reflected in a direction determined by routing per wavelength.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 1 is a diagram illustrating a configuration of a wavelength selective switch array according to a first embodiment;

FIG. 10 is a diagram illustrating a configuration of a pixel of a reflective liquid crystal display device of a third embodiment;

DETAILED DESCRIPTION OF THE INVENTION

Embodiments will be described hereinafter in detail, based on the drawings. Embodiments are not limited by the embodiments described hereinafter. Furthermore, components in the following embodiments include those easily substitutable by persons skilled in the art or those that are substantially the same.

First Embodiment

Figure 1:
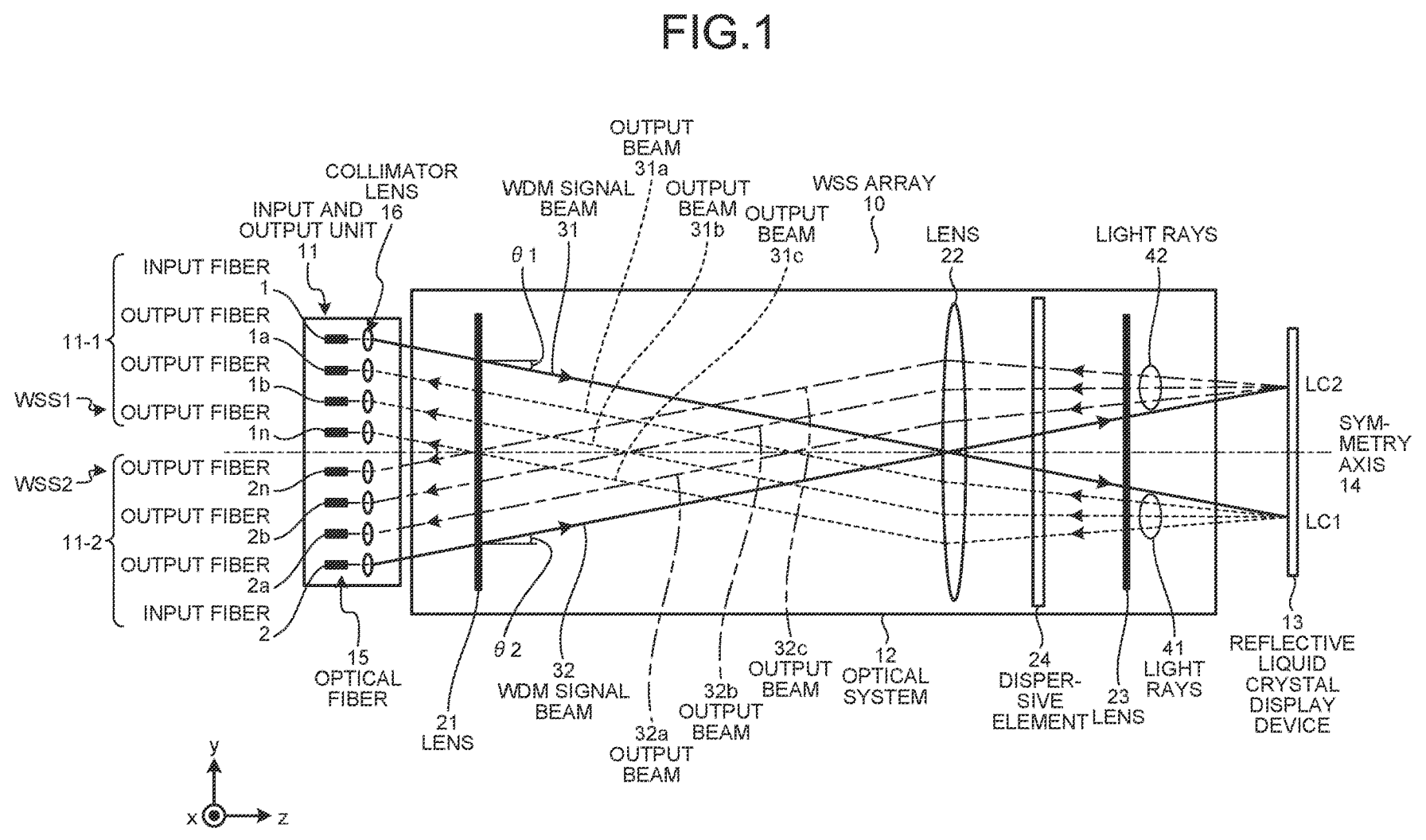
Figure 2:
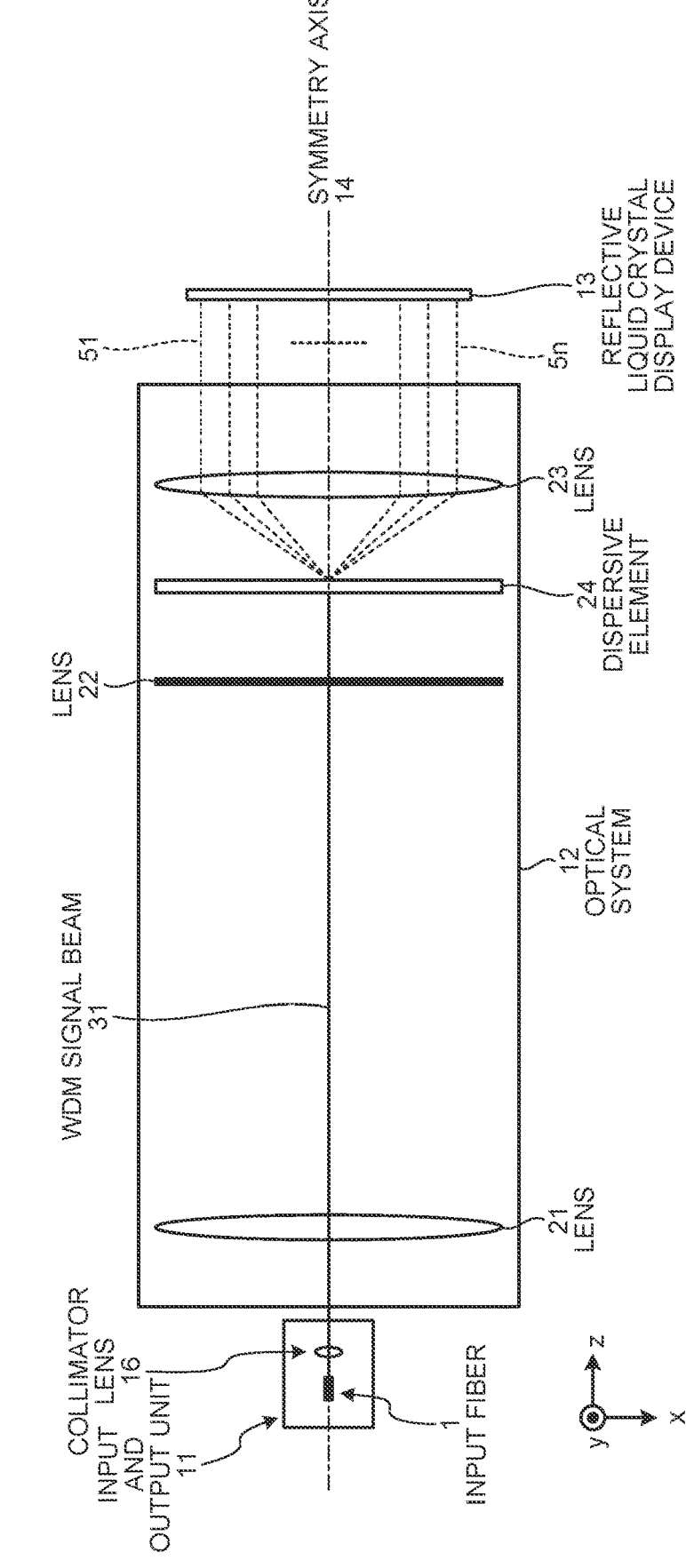
FIG. 2 is a diagram illustrating the configuration of the wavelength selective switch array according to the first embodiment.

FIG. 1 and FIG. 2 are diagrams illustrating a configuration of a wavelength selective switch (WSS) array according to a first embodiment. FIG. 1 is a diagram of a WSS array 10 as viewed in a direction opposite to an x-axis direction. FIG. 2 is a diagram of the WSS array 10 as viewed in a direction opposite to a y-axis direction.

The WSS array 10 corresponds to an example of an "optical node device" of the present application.

The WSS array 10 of the present application has at least two WSSs used in a single package. The WSS array 10 of the present application enables independent operation of each of these WSSs in the WSS array 10 without need for dedicated optical elements. In fact, many of optical elements can be shared among the WSS devices and cost reduction and downsizing are therefore possible. Such devices are ideally suitable for use, as, for example, reconfigurable optical add/drop multiplexers (ROADMs), in modern communication networks. Furthermore, one or multiple arrays each having two WSSs coupled to each other may be ideally suitable as a component or components in a branch node using a route and select (RS) architecture.

With reference to FIG. 1, the WSS array 10 includes two independent WSS devices WSS1 and WSS2 that are each capable of operating as an independent WSS device. In the present application, the term, "independent", refers to a function of the WSS device WSS1 that independently processes one or plural WDM signals regardless of the WSS device WSS2, and vice versa. In the present application, a term, "processing" is used broadly, and includes, for example, modulating, attenuating, blocking, changing directions of, and/or switching over individual wavelength channels forming each WDM signal.

The WSS array 10 includes an input and output unit 11 and an optical system 12. The optical system 12 is configured to implement beam shaping of each WDM signal beam. Furthermore, the optical system 12 is configured to implement spectral dispersion (demultiplexing) of each WDM signal into wavelength channels (or groups of wavelength channels) forming the WDM signal. In addition, the optical system 12 is configured to implement spectral coupling (multiplexing) of the dispersed wavelength channels (or the groups of the wavelength channels) into one or multiple WDM signals. Furthermore, the WSS array 10 includes a reflective liquid crystal display device 13. The reflective liquid crystal display device 13 is configured to optically process the dispersed wavelength channels in order to change a direction of each of the individual wavelength channels along a predetermined route in the WSS array 10, for example.

The reflective liquid crystal display device 13 corresponds to an example of a "liquid crystal display device" of the present application. The reflective liquid crystal display device 13 will be described in detail after a second embodiment.

The WSS array 10 enables the single optical system 12 and the single reflective liquid crystal display device 13 to be shared by some of the WSS devices of the WSS array 10, the WSS devices WSS1 and WSS2 in this example, by use of an architecture symmetrical with respect to a symmetry axis 14. However, while the WSS devices WSS1 and WSS2 are able to share many of the same optical parts, the architecture of the first embodiment enables the WSS devices WSS1 and WSS2 of the WSS array 10 to be independently controllable devices. Therefore, the WSS array 10 of the first embodiment is downsized and reduced in optical complexity. Additionally, the WSS array 10 provides a multi WSS device having independent processing capacity specific to a device that is more large-sized and requires a high cost.

In the present application, the input and output unit 11 may include certain numbers of input ports and output ports for transmitting one or multiple optical WDM signals. For example, the device may include certain numbers of optical fibers and planar waveguides, and each of these may be assigned as an input port or an output port. In the first embodiment described hereinafter, the input ports or the output ports are implemented as optical fibers 15. However, without departing from the scope of the present application, any other type of a port may be used.

The input and output unit 11 includes an input and output unit 11-1 for the WSS device WSS1. The input and output unit 11-1 includes an input fiber 1 and some output fibers 1a, 1b, . . . , 1n. Herein, n is a natural number. The input and output unit 11 further includes an input and output unit 11-2 for the WSS device WSS2. The input and output unit 11-2 includes an input fiber 2 and some output fibers 2a, 2b, . . . , 2n. Herein, n is a natural number. Therefore, FIG. 1 illustrates, as an example, an array of two 1× n WSS devices including the WSS devices WSS1 and WSS2. In other words, the input and output unit 11 of the WSS array 10 includes an array of the input fiber 1, the output fibers 1a, 1b, . . . , 1n, the input fiber 2, and the output fibers 2a, 2b, . . . , 2n forming an optical fiber stack arranged along the y-axis direction.

The input and output unit 11 further includes an array of collimator lenses 16 in a form of a microlens array. The array of the collimator lenses 16 is arranged in front (a z-direction) of an array of corresponding optical power elements, for example, in front of the output unit and/or the input unit of the optical fibers. In the present application, the collimator lenses 16 include any optical element capable of inducing and/or changing a direction of an optical beam, and/or condensing a set of light rays. A first group including the input fiber 1 and the output fibers 1a, 1b, . . . , 1n is combined with a first group of the collimator lenses 16 to form the input and output unit 11-1 of the WSS device WSS1. A second group including the input fiber 2 and the output fibers 2a, 2b, . . . , 2n is combined with a second group of the collimator lenses 16 to form the input and output unit 11-2 of the WSS device WSS2. FIG. 1 illustrates the WSS array 10 implemented as the microlens array, but without departing from the scope of the present application, another type of WSS array may be used.

In the present application, for example, optical axes of the optical fibers of the first group are displaced from optical axes of the collimator lenses 16 of the first group. Due to this relative displacement between the array of the input port and the output ports and the array of the collimator lenses 16, the input beam and the output beams of the first group are transmitted such that the input beam enter the optical system 12 and the out beams exit the optical system 12 at an angle θ1 with respect to the symmetry axis 14. The group of the input beam and the output beams of the WSS device WSS1 is thereby transmitted along the angle θ1 in a downward direction as a whole (a direction opposite to the y-axis direction).

Similarly, optical axes of the optical fibers of the second group are displaced from optical axes of the collimator lenses 16 of the second group. The input beam and the output beams of the second group are transmitted such that the input beam enter the optical system 12 and the out beams exit the optical system 12 of the WSS device WSS2 is thereby transmitted along the angle θ2 in an upward direction as a whole (the y-axis direction).

As described above, the example illustrated in FIG. 1 is the WSS array 10 in which two 1× n WSSs, that is, the WSS devices WSS1 and WSS2, are used. Therefore, in the example illustrated in FIG. 1, the WSS array 10 includes the single input fiber 1 that inputs a WDM signal beam 31 into the device and the single input fiber 2 that inputs a WDM signal beam 32 into the device. The input fiber/output fiber configuration illustrated herein is just illustrated for a purpose of illustrating an example and is not intended to limit the scope of the present application. Rather, any useful input port/output port combination may be used without departing from the scope of the present application.

The WDM signal beam 31 is transmitted from the input fiber 1 to the device, passes through the collimator lens 16, and thereafter travels through the optical system 12 at the angle θ1 in a y-z plane. The WDM signal beam 31 thereafter enters a lens 21 for shaping the WDM signal beam 31 in an x-direction. For example, the lens 21 may be a cylindrical lens having a cylindrical axis extending along a y-direction. Therefore, when viewed from the viewpoint as illustrated in FIG. 1, the lens 21 has no influence on the WDM signal beam 31.

After passing through the lens 21, the WDM signal beam 31 enters a lens 22. In the example illustrated in FIG. 1, the lens 22 may be a cylindrical lens having a cylindrical axis extending along the x-direction. An effect of the lens 22 is dependent on the reflective liquid crystal display device 13 positioned on a focal plane of the lens 22. Furthermore, the lens 22 has its center (the cylindrical axis) on the symmetry axis 14. Since the reflective liquid crystal display device 13 is positioned on the focal plane of the lens 22, any set of collimated light rays entering the lens 22 is condensed to the same height on the reflective liquid crystal display device 13. Conversely, any set of light rays starting from the same height on the reflective liquid crystal display device 13 is output from the lens 22 as a set of collimated light rays.

For example, as illustrated in FIG. 1, any incident beam (for example, the WDM signal beam 31) traveling along the angle θ1 is directed by the lens 22 to head to a position LC1 on a y-axis on the reflective liquid crystal display device 13. Conversely, a group of light rays 41 starting from the position LC1 on the reflective liquid crystal display device 13 is output from the lens 22 as collimated light rays traveling at the same angle θ1 as illustrated in FIG. 1. Similarly, any incident beam (for example, the WDM signal beam 32) traveling along the angle θ2 is directed by the lens 22 to head to a position LC2 on the y-axis on the reflective liquid crystal display device 13. Conversely, a group of light rays 42 starting from the position LC2 on the reflective liquid crystal display device 13 is output from the lens 22 as collimated light rays traveling at the same angle θ2 as illustrated in FIG. 1.

As to the propagation of the WDM signal beam 31 passing through the optical system 12, after passing through the lens 22, the WDM signal beam 31 passes through a dispersive element 24 that causes an angular dispersion of the wavelength channels of the WDM signal beam 31, as illustrated in FIG. 1 and FIG. 2. In the present application, the dispersive element 24 may be a transmission optical component, such as a diffraction grating or a prism.

After passing through the dispersive element 24, as illustrated in FIG. 1 and FIG. 2, the dispersed wavelength channels pass through a lens 23 that condenses each of the dispersed wavelength channels onto the surface of the reflective liquid crystal display device 13. In the present application, the lens 23 may be a cylindrical lens.

The reflective liquid crystal display device 13 is a two-dimensional pixelation optical element, for example, a pixelation spatial light modulator. As described in more detail hereinafter, the two-dimensional pixelation optical element is capable of reflecting or changing a direction or directions of one or multiple ones of the dispersed wavelength channels so that the one or multiple ones of the dispersed wavelength channels is/are routed to any one of the output fibers.

As to the WSS device WSS1, according to the present application, since there is the lens 22, all of the light rays starting from the position LC1 on the reflective liquid crystal display device 13 are output from the lens 22 along the angle θ1 as illustrated in FIG. 1. However, all of the light rays starting from the position LC1 on the reflective liquid crystal display device 13 are displaced from one another by amounts according to their deflection angles from the reflective liquid crystal display device 13. Therefore, in a case in which the deflection angles are appropriately set, each of the output light rays that are reflected can be routed to any output fiber of the output fibers 1a, 1b, . . . , 1n. The reflected output light rays are, for example, reflected output light rays corresponding to the group of the light rays 41 each of which may include one or multiple ones of the wavelength channels of the WDM signal beam 31. Furthermore, in the present application, each of the collimator lenses 16 is displaced at the corresponding output fiber by the same amount, and each of the output beams is thus able to be recoupled to each of the output fibers in a state in which an efficiency thereof has been improved.

Similarly, as to the WSS device WSS2, according to the present application, since there is the lens 22, all of the light rays starting from the position LC2 on the reflective liquid crystal display device 13 are output from the lens 22 along the angle θ2 as illustrated in FIG. 1. However, all of the light rays starting from the position LC2 on the reflective liquid crystal display device 13 are displaced from one another by amounts according to their deflection angles from the reflective liquid crystal display device 13. Therefore, in a case in which the deflection angles are appropriately set, each of the output light rays that are reflected can be routed to any output fiber of the output fibers 2a, 2b, . . . , 2n. The reflected output light rays are, for example, reflected output light rays corresponding to the group of the light rays 42 each of which may include one or multiple ones of the wavelength channels of the WDM signal beam 32. Furthermore, in the present application, each of the collimator lenses 16 is displaced at the corresponding output fiber by the same amount, and each of the output beams is thus able to be recoupled to each of the output fibers in a state in which an efficiency thereof has been improved.

Therefore, a combination of the input and output unit 11 and the lens 22 transmits given sets of beams along given angles (for example, in the case of the WSS device WSS1, the angle $\theta 1$, and in the case of the WSS device WSS2, the angle $\theta 2$). Thereafter, the combination of the input and output unit 11 and the lens 22 serves as a WSS array device that directs these beams to head to positions (the position LC1 and the position LC2) on the reflective liquid crystal display device 13 dependent only on input angles. Therefore, the WSS array 10 enables two sets to share the same optical system 12 and the reflective liquid crystal display device 13, the two sets being: the WDM signal beams 31 and 32 from the WSS devices WSS1 and WSS2; or the light rays 41 and 42 to the WSS devices WSS1 and WSS2. At the same time, the WSS array 10 has capability of a WSS array that separately processes each of the wavelength channels.

In FIG. 2, the stacks of fibers and microlenses forming the input and output unit 11 are being observed from the top of the fiber stack and only the input fiber 1 is thus visible with its corresponding collimator lens 16. The description hereinafter is focused on the WSS device WSS1 but due to symmetry of the system, the same explanation applies to the WSS device WSS2.

As described above, in the case of the WSS device WSS1, the WDM signal beam 31 is input to the system via the input fiber 1. In FIG. 2, the angle $\theta 1$ is not visible because the angle $\theta 1$ is along a direction of going into the plane of paper. In the present application, the WDM signal beam 31 includes some wavelength channels, and the channels have a wavelength range from a longest wavelength $\lambda 1$ to a shortest wavelength $\lambda n$. In some examples, there may be many wavelength channels, and for example, there may be 96 wavelength channels having 50 GHz or 100 GHz intervals on a fixed grating. In another example, a device may be used in an adaptive grating system in which, for example, a frequency interval of 12.5 GHz can be used and 97 or more wavelength channels, for example, 130 or more wavelength channels are available.

The WDM signal beam 31 enters the lens 21 first. The lens 21 functions to expand the beam to a diameter suitable for achieving a desired beam size on the dispersive element 24. For example, the collimator lens 16 and the lens 21 may function as a beam expansion telescope. In the present application, the dispersive element 24 functions to cause an angular dispersion of the wavelength channels of the WDM signal beam 31 in the x-axis direction, as illustrated in FIG. 2. Each of wavelength channels 51 to 5n is angularly dispersed in the x-axis direction by the dispersive element 24, and is thereafter condensed onto the surface of the reflective liquid crystal display device 13 by the lens 23. The wavelength channels 51 to 5n are thereby spatially dispersed in a wavelength dispersion direction (x-axis direction) on the reflective liquid crystal display device 13 according to the wavelengths.

Figure 3:
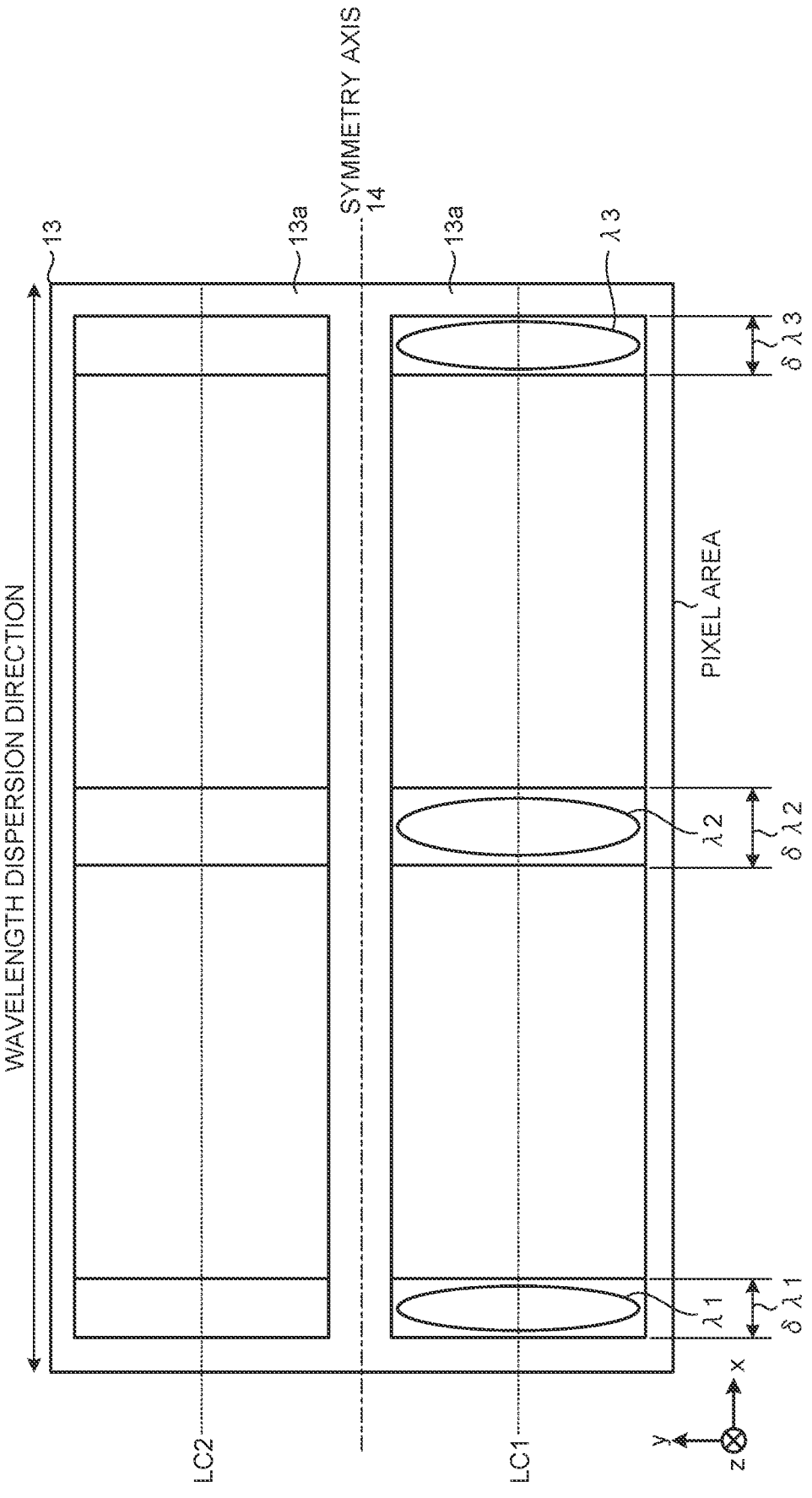
FIG. 3 is a diagram illustrating a reflective liquid crystal display device of a wavelength selective array of the first embodiment.

FIG. 3 is a diagram illustrating a reflective liquid crystal display device of a WSS array according to the first embodiment. FIG. 3 is a diagram of the reflective liquid crystal display device 13 as viewed from a z-axis direction.

An example of the distribution of the wavelength channels on the surface of the reflective liquid crystal display device 13 is more clearly illustrated in FIG. 3. More generally, the wavelength channels may be arranged as long strips or oval spots on a two-dimensional surface of the reflective liquid crystal display device 13.

Concisely stated, the wavelength channels are processed as discrete wavelength signals that may be independently affected by the reflective liquid crystal display device 13. However, in the present application, the reflective liquid crystal display device 13 does not necessarily affect each of the wavelength channels and may affect a group of the wavelength channels. Furthermore, as illustrated in FIG. 3, each of the wavelength channel or the group of the wavelength channels do not necessarily have a fixed bandwidth. This is because the reflective liquid crystal display device 13 is able to be implemented as a spatial light modulator that is dynamically completely reconfigurable. Therefore, the present application may be implemented in an existing fixed grating architecture and/or an existing or a future-developed highly adaptive grating architecture.

With reference to FIG. 2 again, the reflective liquid crystal display device 13 selectively changes the direction or directions of one or multiple ones of the wavelength channels 51 to 5n in a certain direction or directions. The reflective liquid crystal display device 13 is capable of changing the direction or directions of a selected one or multiple selected ones of the wavelength channels 51 to 5n so that it is or they are ultimately directed to one or multiple output ports (for example, one or multiple output fibers (see FIG. 1) that are inside the plane of paper of FIG. 2). In the case illustrated in FIG. 2, the direction change achieved by the reflective liquid crystal display device 13 is implemented along an angle positioned on a plane (the y-z plane) orthogonal to the plane of paper. The directions of the wavelength channels 51 to 5n are changed, for example, as described and stated in more detail already by reference to FIG. 1. The wavelength channels 51 to 5n that have been changed in their directions enter the lens 23 again after being reflected by the reflective liquid crystal display device 13, are further changed in their directions to reach the dispersive element 24, and are recoupled at the dispersive element 24. For example, the wavelength channels 51 to 5n changed in their directions along the same angle are recoupled into a single beam, and this single beam is thereafter changed in the direction along a direction enabling output of a processed signal from one of the output ports.

For example, the WDM signal beam 31 including three WDM channels respectively having wavelengths $\lambda 1$, $\lambda 2$, and $\lambda 3$ and channel bandwidths $\delta\lambda 1$, $\delta\lambda 2$, and $\delta\lambda 3$ will be discussed herein. In the example illustrated in FIG. 1, the WDM signal beam 31 enters the system at the angle $\theta 1$. Furthermore, the WDM signal beam 31 traveling at the angle $\theta 1$ passes through the center of the lens 22 and is not deflected away from the angle $\theta 1$. After passing through the dispersive element 24, the three wavelength channels of the WDM signal beam 31 are angularly dispersed in an orthogonal plane (an x-z plane) but all of the angularly dispersed channels still continue to travel at the angle $\theta 1$. These three dispersed wavelength channels are thereafter condensed to different positions on the reflective liquid crystal display device 13 by the lens 23, as illustrated in FIG. 3.

Concerning a routing function of the device, a combination of some different routings is possible herein. For example, a case in which all of the three wavelength channels are desirably routed to the output fiber 1n illustrated in FIG. 1 will be discussed herein. The corresponding portions on the reflective liquid crystal display device 13 deflect the wavelength channels having the wavelengths λ1, λ2, and λ3 so that each of the wavelength channels having the wavelengths λ1, λ2, and λ3 is returned along one of the light rays 41 illustrated in FIG. 1. An effect of the dispersive element 24 on return routes of these wavelength channels is to recouple (multiplex) the wavelength channels into the same beam currently being propagated. This coupled beam is changed in the direction by the lens 22 to have the angle θ1, and thereafter propagates along an output beam 31c that has already been displaced from the WDM signal beam 31. An effect of the collimator lens 16 is to couple the output beam 31c, that has been recoupled and changed in the direction, to the output fiber 1n. In this operation mode, an effect of the WSS device WSS1 is thus to cause all of the three wavelength channels of the WDM signal beam 31 to travel from the input fiber 1 to the output fiber 1n.

In another example, in some cases, some of the wavelength channels may be desired to be routed separately to different output fibers. For example, in some cases, the reflective liquid crystal display device 13 deflects the wavelength channel of the wavelength λ1 along an output beam 31a, deflects the wavelength channel of the wavelength λ2 along an output beam 31b, and deflects the wavelength channel of the wavelength λ3 along the output beam 31c. An effect of the dispersive element 24 in this example is also to change the direction of each of these output beams. However, in this case, instead of recoupling the output beams into a single beam, the dispersive element 24 generates three output beams that travel by spreading out in a fan-like form. Furthermore, each of these output beams starts from the same position LC1 on the y-axis on the reflective liquid crystal display device 13, and these output beams are thus output from the lens 22 as a set of collimated light rays propagating along the same angle θ1 as the original WDM signal beam 31. However, the output beams enter the lens 22 at different heights (different positions on the y-axis) and are thus displaced from each other. As a result, the wavelength channel of the wavelength λ1 propagates along the output beam 31a, the wavelength channel of the wavelength λ2 propagates along the output beam 31b, and the wavelength channel of the wavelength λ3 propagates along the output beam 31c, for example. Therefore, in this configuration, an effect of the WSS device WSS1 is to route the wavelength channel of the wavelength λ1 from the input fiber 1 to the output fiber 1a. Furthermore, an effect of the WSS device WSS1 is to route the wavelength channel of the wavelength λ2 from the input fiber 1 to the output fiber 1b. In addition, an effect of the WSS device WSS1 is to route the wavelength channel of the wavelength λ3 from the input fiber 1 to the output fiber 1n.

In view of the above, it is evident that any wavelength channel of a WDM signal beam is able to be routed to any output fibers as required, in the WSS array 10 of the present application. Furthermore, due to the symmetry of the system illustrated in FIG. 1, the above description similarly applies to use of the WSS device WSS2 for routing of the WDM signal beam 32 (32a, 32b, 32c). This is because, as illustrated in FIG. 3, the dispersed wavelength channels in the WSS devices WSS1 and WSS2 are eventually condensed respectively to different portions on the reflective liquid crystal display device 13. Furthermore, it can be understood that although a single input port and n output ports are used in the example illustrated in FIG. 1 to FIG. 3, any of the output ports may be reconfigured as an input port or input ports, and vice versa. In addition, without departing from the scope of the present application, any numbers of input ports and output ports may be used. Similarly, the example explicitly illustrated in FIG. 1 to FIG. 3 is the WSS array 10 where the two WSS devices WSS1 and WSS2 are used, but without departing from the scope of the present application, any number of WSS devices may be used. For example, in a case in which the input and output unit 11 is designed to use four distinct transmitting angles, the WSS array 10 may provide four independent WSS devices.

Second Embodiment and Comparative Example

The second embodiment will be described hereinafter, but to facilitate understanding of the second embodiment, a comparative example will be described first.

Comparative Example

Figure 4:
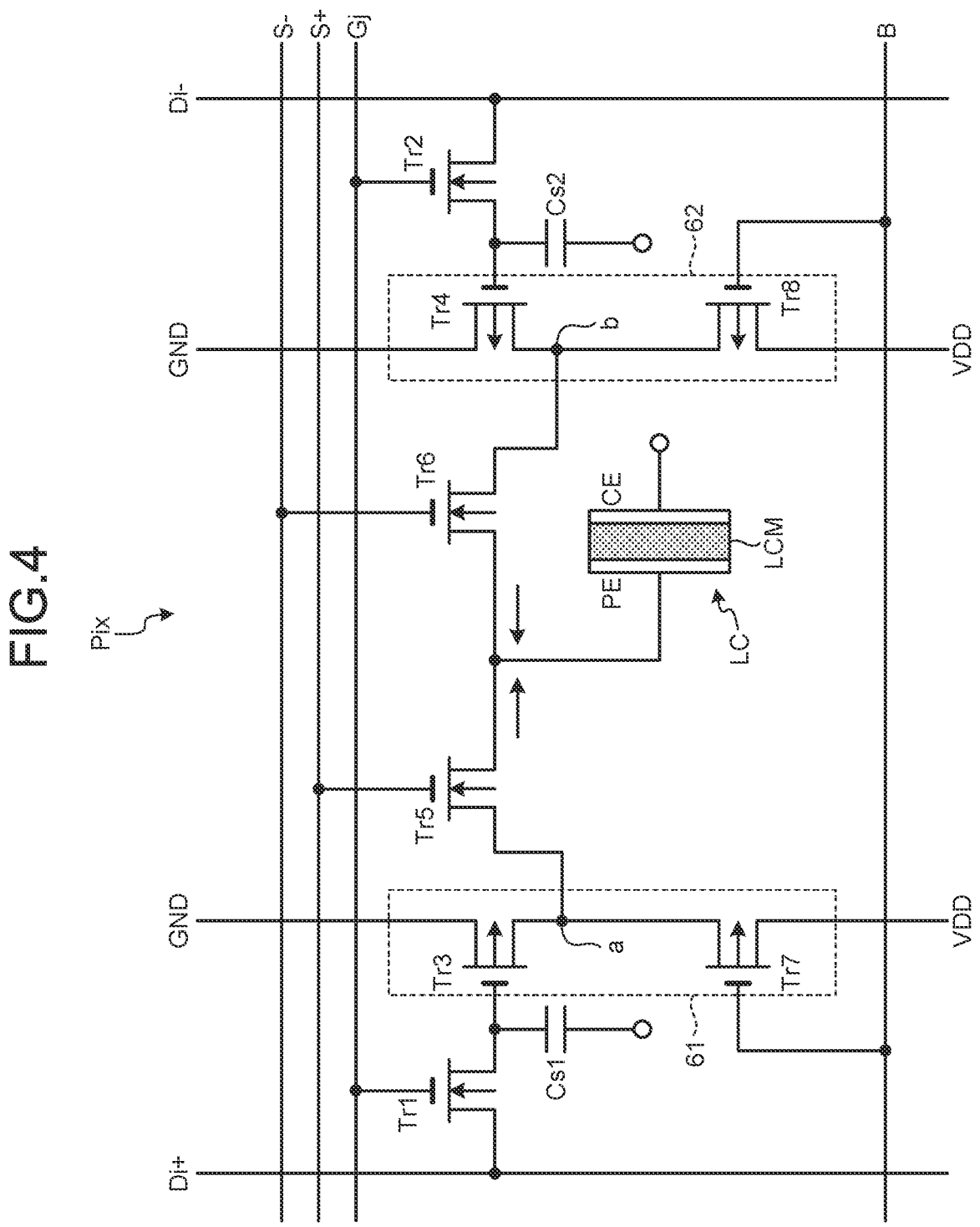
FIG. 4 is a diagram illustrating a configuration of a pixel of a reflective liquid crystal display device of a comparative example.

FIG. 4 is a diagram illustrating a configuration of a pixel of a reflective liquid crystal display device of the comparative example. The reflective liquid crystal display device includes multiple pixels Pix arranged in a matrix. FIG. 4 is diagram illustrating a configuration of a pixel Pix of a j-th row and an i-th column (where i and j are natural numbers).

As illustrated in FIG. 4, the pixel Pix includes a holding capacitor (a capacitor) Cs1 that holds a positive polarity pixel signal and a transistor Tr1 for switching for writing the positive polarity pixel signal into the holding capacitor Cs1. The transistor Tr1 is an N-channel metal oxide semiconductor (hereinafter, NMOS) transistor, but the present application is not limited to this example. Furthermore, the pixel Pix includes a holding capacitor Cs2 that holds a negative polarity pixel signal and a transistor Tr2 for switching for writing the negative polarity pixel signal into the holding capacitor Cs2. The transistor Tr2 is an NMOS transistor, but the present application is not limited to this example.

The transistor Tr1 corresponds to an example of a "first transistor" of the present application. The transistor Tr2 corresponds to an example of a "second transistor" of the present application.

Furthermore, the pixel Pix includes a source follower circuit 61 that is an impedance conversion buffer connected to a signal storage node (a high-potential side terminal in this example) of the holding capacitor Cs1. The source follower circuit 61 is configured to include transistors Tr3 and Tr7. Each of the transistors Tr3 and Tr7 is a P-channel MOS (hereinafter, PMOS) transistor, but the present application is not limited to this example. Furthermore, the pixel Pix includes a source follower circuit 62 that is an impedance conversion buffer connected to a signal storage node (a high-potential side terminal in this example) of the holding capacitor Cs2. The source follower circuit 62 is configured to include transistors Tr4 and Tr8. Each of the transistors T4 and Tr8 is a PMOS transistor, but the present application is not limited to this example.

The source follower circuit 61 corresponds to an example of a "first source follower circuit" of the present application. The source follower circuit 62 corresponds to an example of a "second source follower circuit" of the present application. The transistor Tr3 corresponds to an example of a "third transistor" of the present application. The transistor Tr4 corresponds to an example of a "fourth transistor" of the present application.

Furthermore, the pixel Pix includes a transistor Tr5 connected between an output terminal a of the source follower circuit 61 and a pixel electrode PE. The transistor Tr5 is a switching transistor that is capable of controlling conduction or non-conduction of output voltage of the source follower circuit 61 to the pixel electrode PE. The transistor Tr5 is an NMOS transistor, but the present application is not limited to this example. Furthermore, the pixel Pix includes a transistor Tr6 connected between an output terminal b of the source follower circuit 62 and the pixel electrode PE. The transistor Tr6 is a switching transistor that is capable of controlling conduction or non-conduction of output voltage of the source follower circuit 62 to the pixel electrode PE. The transistor Tr6 is an NMOS transistor, but the present application is not limited to this example.

The transistor Tr5 corresponds to an example of a "fifth transistor" of the present application. The transistor Tr6 corresponds to an example of a "sixth transistor" of the present application.

Furthermore, the pixel Pix includes a liquid crystal display element LC. The liquid crystal display element LC has a liquid crystal display body (a liquid crystal layer) LCM held between the pixel electrode PE and a common electrode CE that are arranged opposite to each other. The common electrode CE is formed on a counter substrate of the reflective liquid crystal display device, for example, but the present application is not limited to this example.

For each column of the multiple pixels Pix, a pixel data line is composed of a pair of a pixel data line Di+ for positive polarity and a pixel data line Di− for negative polarity, and pixel signals which are sampled by a pixel data line drive circuit not illustrated in the drawings and which have different polarities from each other are respectively supplied thereto. A drain terminal of the transistor Tr1 is connected to the pixel data line Di+. A drain terminal of the transistor Tr2 is connected to the pixel data line Di−. Gate terminals of the transistors Tr1 and Tr2 are connected to the same row scan line (gate line) Gj for the same row. In response to supply of a scan pulse (a row scan signal VD) to the gate terminals of the transistors Tr1 and Tr2 via the row scan line Gj from a vertical scan circuit not illustrated in the drawings, the transistors Tr1 and Tr2 are brought into an on-state at the same time and a positive polarity pixel signal and a negative polarity pixel signal are respectively accumulated in the holding capacitor Cs1 and the holding capacitor Cs2.

The pixel data line Di+ corresponds to an example of a "positive polarity pixel data line" of the present application. The pixel data line Di− corresponds to an example of a "negative polarity pixel data line" of the present application.

The transistor Tr3 of the source follower circuit 61 functions as a signal input transistor and the transistor Tr7 functions as a constant current load transistor. The transistor Tr4 of the source follower circuit 62 functions as a signal input transistor and the transistor Tr8 functions as a constant current load transistor. In the pixels of the same row, the same wiring B is commonly connected to gate terminals of the transistors Tr7 and Tr8 that are constant current load transistors to have a configuration in which bias control of the constant current load transistors is possible. Input resistances of the source follower circuits 61 and 62 including the MOS transistors are very large (almost infinite). Therefore, accumulated charges in the holding capacitor Cs1 and the holding capacitor Cs2 are held without leaking, similarly to those in conventional active matrix liquid crystal display devices, until a signal is newly written after one vertical scan period.

The transistors Try and Tr6 are switched to output voltages of the source follower circuits 61 and 62 to the liquid crystal display element LC.

A gate terminal of the transistor Tr5 that performs switching of the positive polarity pixel signal and a gate terminal of the transistor Tr6 that performs switching of the negative polarity pixel signal are independent of each other. The gate terminal of the transistor Tr5 is connected to a wiring S+ where a positive polarity gate control signal is supplied, and the gate terminal of the transistor Tr6 is connected to a wiring S− where a negative polarity gate control signal is supplied. By the positive polarity gate control signal and the negative polarity gate control signal being turned on alternately, the transistors Tr5 and Tr6 are alternately brought into the on-state and are able to supply a pixel signal that is inverted between positive polarity and negative polarity, to the liquid crystal display element LC. That is, the pixel Pix itself has a polarity inversion function. By control of the transistors Tr5 and Tr6 at a high speed, the pixel Pix can be driven by alternating current at a high frequency without constraint of a vertical scan frequency.

The positive polarity gate control signal corresponds to an example of a "first control signal" of the present application. The negative polarity gate control signal that is turned on alternately with the positive polarity gate control signal corresponds to an example of a "second control signal" of the present application.

Figure 5:
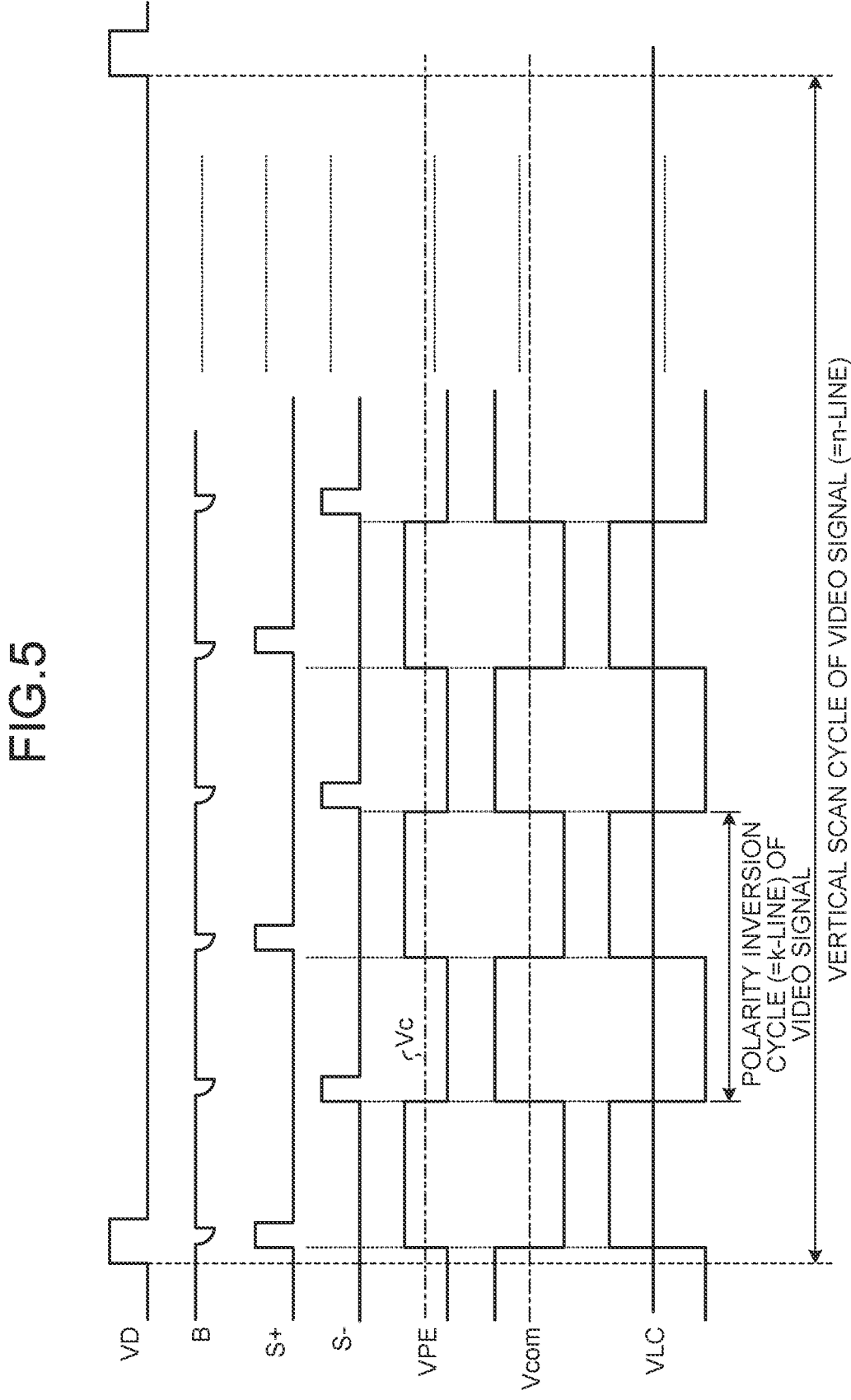
FIG. 5 is a diagram illustrating an outline of alternating current drive control of the reflective liquid crystal display device of the comparative example.

FIG. 5 is a diagram illustrating an outline of alternating current drive control of the reflective liquid crystal display device of the comparative example.

In a period during which the positive polarity gate control signal applied to the wiring S+ is at a high level, the transistor Tr5 for positive polarity switching is brought into the on-state. When a buffer load control signal applied to the wiring B reaches a low level during this period, the source follower circuit 61 becomes active and the pixel electrode PE is charged to a positive polarity pixel signal level. When the pixel electrode PE has been completely charged, the buffer load control signal through the wiring B reaches a high level, and when the positive polarity gate control signal reaches a low level, the pixel electrode PE is brought into a floating state and a positive polarity pixel voltage is held at the liquid crystal display element LC.

By contrast, in a period during which the negative polarity gate control signal applied to the wiring S− is at a high level, the transistor Tr6 for negative polarity switching is brought into the on-state. When a buffer load control signal applied to the wiring B reaches a low level during this period, the source follower circuit 62 becomes active and the pixel electrode PE is charged to a negative polarity pixel signal level. When the pixel electrode PE has been completely charged, the buffer load control signal through the wiring B reaches a high level, and when the negative polarity gate control signal reaches a low level, the pixel electrode PE is brought into a floating state and a negative polarity pixel voltage is held at the liquid crystal display element LC.

Thereafter, by this operation being repeated alternately, a pixel electrode voltage VPE that has been made into alternating by the positive polarity pixel signal and the negative polarity pixel signal is applied to the pixel electrode PE. The pixel Pix is configured to supply a voltage to the liquid crystal display element LC via the source follower circuits 61 and 62, instead of directly transferring charges that have been held at the holding capacitor Cs1 and holding capacitor Cs2 to the liquid crystal display element LC. Therefore, even if the pixel electrode PE is repeatedly charged and discharged with positive polarity and negative polarity, the pixel Pix is free from a problem of charge neutralization and ca be driven without attenuation of the voltage level.

Furthermore, as illustrated in FIG. 5, a common voltage Vcom applied to the common electrode CE is inverted in synchronization with polarity switching of the pixel electrode PE, for a reference potential level approximately equal to an inversion reference potential Vc of the potential of the pixel electrode PE. A substantial alternating current drive voltage of the liquid crystal display body LCM is a differential voltage between the pixel electrode PE and the common electrode CE, and an alternating current voltage VLC without any direct current component is thus applied to the liquid crystal display body LCM. Accordingly, in the pixel Pix, by switching the voltage applied to the common electrode CE in opposite phase to the pixel electrode PE, an amplitude of the voltage supplied to the pixel electrode PE can be decreased. Therefore, in the pixel Pix, a transistor withstand voltage and power consumption of a circuit that drives the pixel electrode PE can be reduced.

In view of consumption current at the reflective liquid crystal display device, the transistor Tr7 and the transistor Tr8 are not made always active, and are controlled to be active in a limited period during a conduction period of the transistors Try and Tr6. For example, it is assumed herein that a steady current in the source follower circuits 61 and 62 per pixel Pix is a small current of 1 microampere (μA). However, under a condition where the source follower circuits 61 and 62 of all of the pixels steadily consume current, the reflective liquid crystal display device will consume too much current. For example, it is estimated that a consumption current of a reflective liquid crystal display device of full HD of 2 million pixels runs into 2 A. Therefore, as described in Patent Application Laid-open No. No. 2009-223289, a method of reducing a consumption current has been proposed.

As illustrated in FIG. 5, a period during which a gate bias voltage (the wiring B) of the transistors Tr7 and Tr6 that are constant current load transistors is at a low level is limited to only a transition period of polarity switching of the pixel electrode PE. The gate bias voltage (the wiring B) of the transistors Tr7 and Tr8 is brought to a high level immediately after the pixel electrode voltage VPE has been charged or discharged to a target level, and currents in the source follower circuits 61 and 62 are stopped. Therefore, although every pixel Pix is configured to include the source follower circuits 61 and 62, a substantial consumption current by the pixel Pix can be maintained low.

Regardless of the vertical scan frequency, an alternating current drive frequency of the liquid crystal display body LCM can be set freely by an inversion control cycle at the pixel Pix. For example, it is assumed herein that the vertical scan frequency is 60 Hz used in a general television video signal and the number n of scan lines for full HD is 1125 lines. If the polarity of the pixel Pix is switched on a cycle of about a line period of 15 lines, an alternating current drive frequency of the liquid crystal display body LCM becomes 60 (Hz)×1125 (lines)÷(15×2)=2.25 (kHz). As described above, a liquid crystal drive frequency of the pixel Pix can be increased rapidly, compared to that of a conventional reflective liquid crystal display device. Thus in the pixel Pix, a sticking phenomenon of the liquid crystal can be suppressed, and reliability, stability, and visual quality deterioration such as stain can be greatly improved as compared to a case in which the alternating current drive of the liquid crystal display body LCM is of a low frequency.

Figure 6:
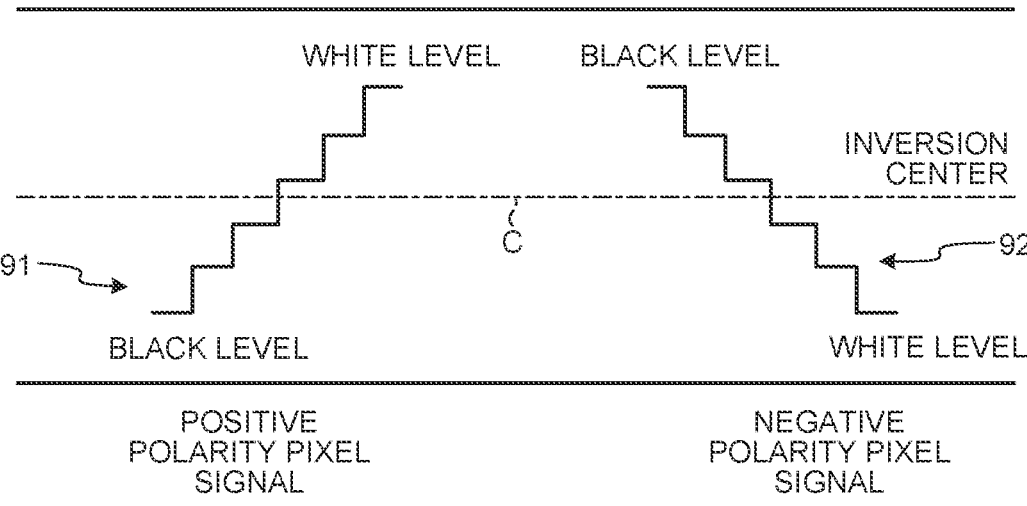
FIG. 6 is a diagram illustrating a relationship between a black level and a white level in a positive polarity pixel signal and a negative polarity pixel signal.

FIG. 6 is a diagram illustrating a relationship between a black level and a white level in a positive polarity pixel signal and a negative polarity pixel signal.

A positive polarity pixel signal 91 indicates a black level that is a minimum gray level when the level is minimum and indicates a white level that is the maximum gray level when the level is maximum, with an inversion center C therebetween. By contrast, a negative polarity pixel signal 92 indicates a white level that is the maximum gray level when the level is minimum and indicates a black level that is the minimum gray level when the level is maximum, with the inversion center C therebetween. Therefore, the positive polarity pixel signal 91 and the negative polarity pixel signal 92 have polarities opposite to each other.

With reference to FIG. 4 again, in the pixel Pix, the transistors Tr1, Tr2, Tr5, and Tr6 are NMOS transistors and the transistors Tr3, Tr4, Tr7, and Tr8 are PMOS transistors. That is, the transistors Tr3 and Tr4 that are source follower transistors are PMOS transistors. Furthermore, the transistors Tr5 and Tr6 that are polarity switching switches are NMOS transistors.

The source follower circuits 61 and 62 using PMOS transistors are amplifiers having a gain of about 0.87 times. Furthermore, since the dynamic range of the voltage applied to the liquid crystal display element LC must be in a linear region, the source follower circuits 61 and 62 cannot be used in a high input voltage region in which a voltage characteristic of an output voltage to an input voltage is nonlinear.

Figure 7:
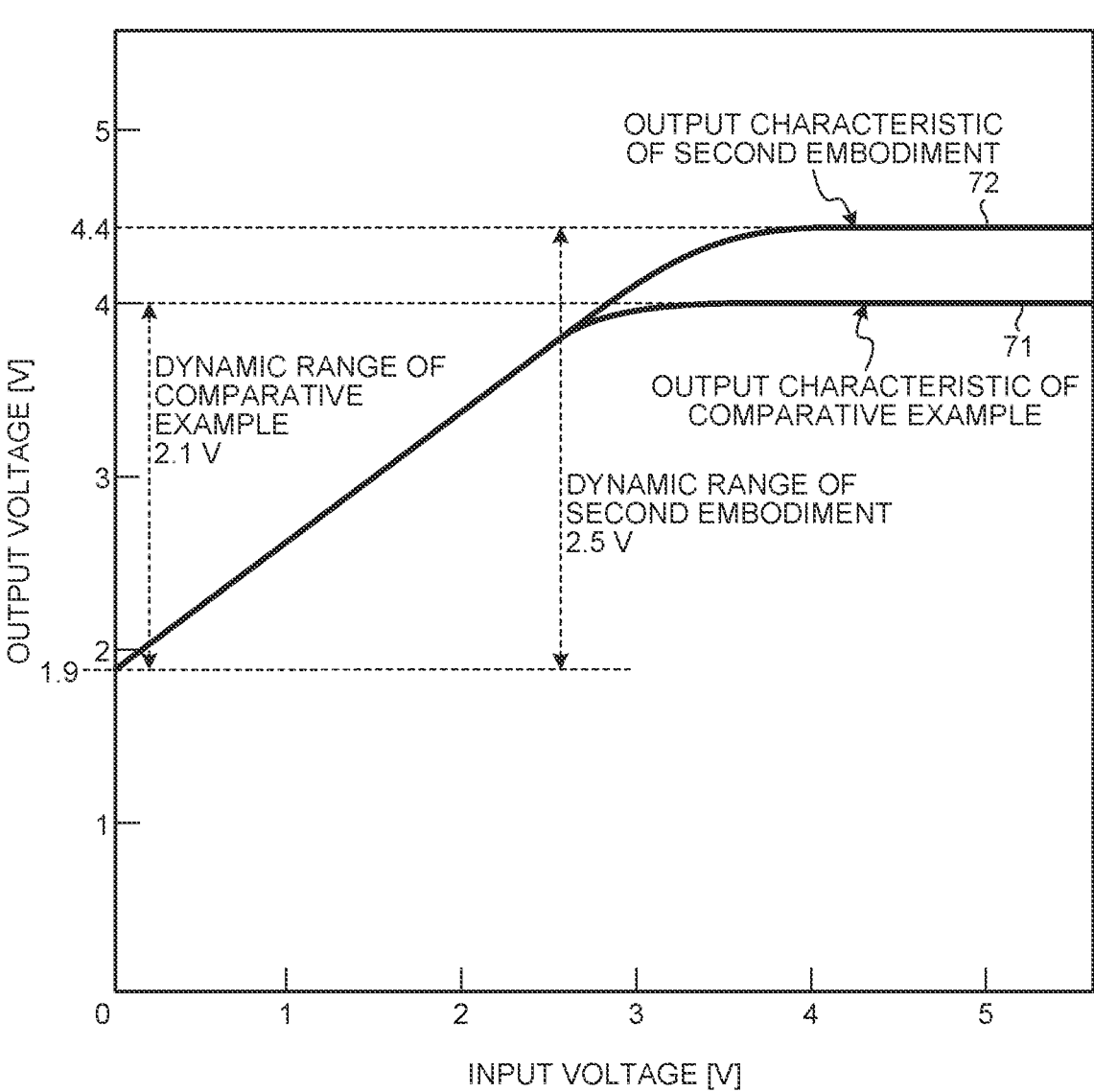
FIG. 7 is a diagram illustrating a relationship between an input voltage and an output voltage of the pixels of the comparative example and a second embodiment.

FIG. 7 is a diagram illustrating a relationship between the input voltage and the output voltage of the pixels in the comparative example and the second embodiment. The input voltage is a voltage applied to the pixel data lines D+ and D−. The output voltage is a voltage applied to the pixel electrode PE.

In the present application, a power supply voltage VDD and a high level voltage of each control signal are assumed to be 5.5 V.

A waveform 71 is a waveform representing a relationship between the input voltage and the output voltage of the pixel Pix in the reflective liquid crystal display device of the comparative example.

A lowest voltage of the output voltage of the pixel Pix will be described first. At the source follower circuits 61 and 62, an offset voltage of about 1.9 V is added to the output voltage for the input voltage. Therefore, even if the voltages at the holding capacitor Cs1 and the holding capacitor Cs2 are 0 V, the voltages at the output terminals a and b do not become 0 V, and become 1.9 V.

A highest voltage of the output voltage of the pixel Pix will be described next. The highest voltage that is able to be conducted between a source terminal and a drain terminal of an ordinary NMOS transistor is a voltage obtained by subtraction of a threshold voltage Vth from 5.5 V (the power supply voltage VDD). In a case in which the voltages at a source terminal and a drain terminal of the ordinary NMOS are 0 V, the threshold voltage Vth is about 0.8 V.

However, in the pixel Pix, as described above, the lowest voltage of the output voltage of the source follower circuits 61 and 62 is 1.9 V. That is, the lowest voltage at the source terminals and drain terminals of the transistors Tr5 and Tr6 is 1.9 V. Therefore, a substrate effect (a substrate bias effect) is generated in the transistors Tr5 and Tr6. The threshold voltage Vth of the transistors Tr5 and Tr6 increases by about 0.7 V due to the substrate effect to thereby be about 1.5 V. Therefore, the highest voltage that is able to be conducted between the source terminals and the drain terminals of the transistors Tr5 and Tr6 is a voltage obtained by subtraction of the threshold voltage of 1.5 V from 5.5 V, that is, 4.0 V (=5.5 V−1.5 V).

As represented by the waveform 71, in a range of 0 V to 3 V of the input voltage, the pixel Pix has a linear region in which the output voltage to the pixel electrode PE changes in a range of 1.9 V to 4 V. However, the output voltage of the pixel Pix starts to saturate from 4 V due to the above mentioned substrate effect of the transistors Tr5 and Tr6. The dynamic range of the voltage applied to the liquid crystal display element LC must be in a linear region. Therefore, the dynamic range of the output voltage of the pixel Pix becomes 2.1 V in the range of 1.9 V to 4 V, for the input voltage in the range of 0 V to 3 V. Narrowing of the voltage range (dynamic range) applied to the liquid crystal display element LC leads to reduction of contrast and reduction of brightness. Therefore, for the pixel Pix, the dynamic range of the output voltage is desirably made wider.

Second Embodiment

Figure 8:
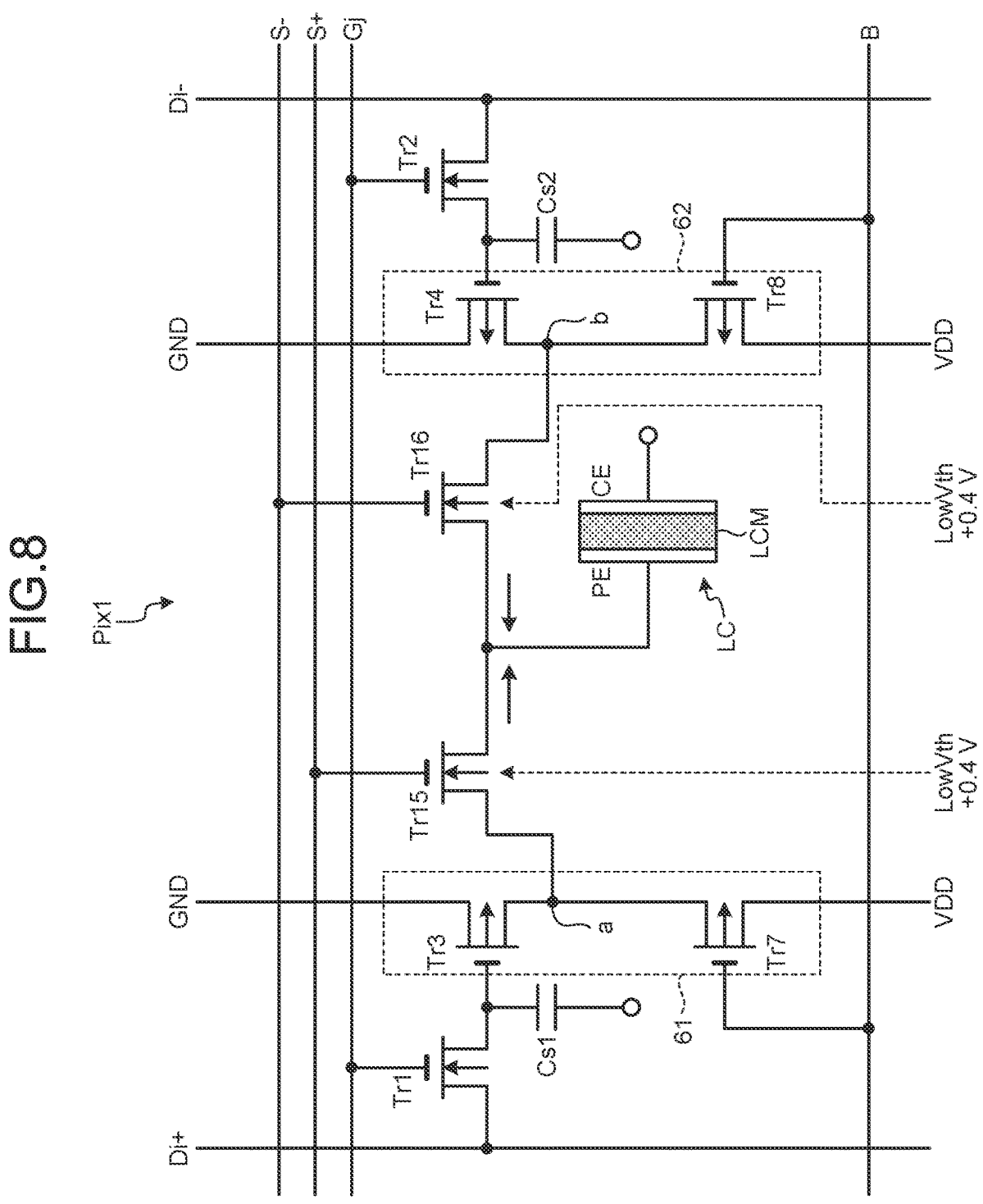
FIG. 8 is a diagram illustrating a configuration of a pixel of a reflective liquid crystal display device of the second embodiment.

FIG. 8 is a diagram illustrating a configuration of a pixel of a reflective liquid crystal display device of the second embodiment.

For components of a pixel Pix1 of the reflective liquid crystal display device of the second embodiment, the same reference signs will be assigned to the components that are the same as those of the pixel Pix of the comparative example, and description thereof will be omitted.

The pixel Pix1 includes transistors Tr15 and Tr16 instead of the transistors Tr5 and Tr6, in contrast with the pixel Pix.

The transistor Tr15 corresponds to an example of the "fifth transistor" of the present application. The transistor Tr16 corresponds to an example of the "sixth transistor" of the present application.

The transistors Tr15 and Tr16 are low threshold voltage (low Vth) NMOS transistors having a threshold voltage Vth lower than that of the transistors Tr5 and Tr6 that are ordinary NMOS transistors. The threshold voltage Vth of the transistors Tr5 and Tr6 that are ordinary NMOS transistors is about 0.8 V, as described above. By contrast, the threshold voltage Vth of the transistors Tr15 and Tr16 that are low Vth NMOS transistors is in a range of being higher than 0 V and lower than 0.8 V, for example, is about 0.4 V, but the present application is not limited to this example.

The transistors Tr16 and Tr16 are transistors having a switch function. When a transistor has a low threshold voltage Vth, the transistor has a large leakage current and is thus not usually suitable as a switch.

Figure 9:
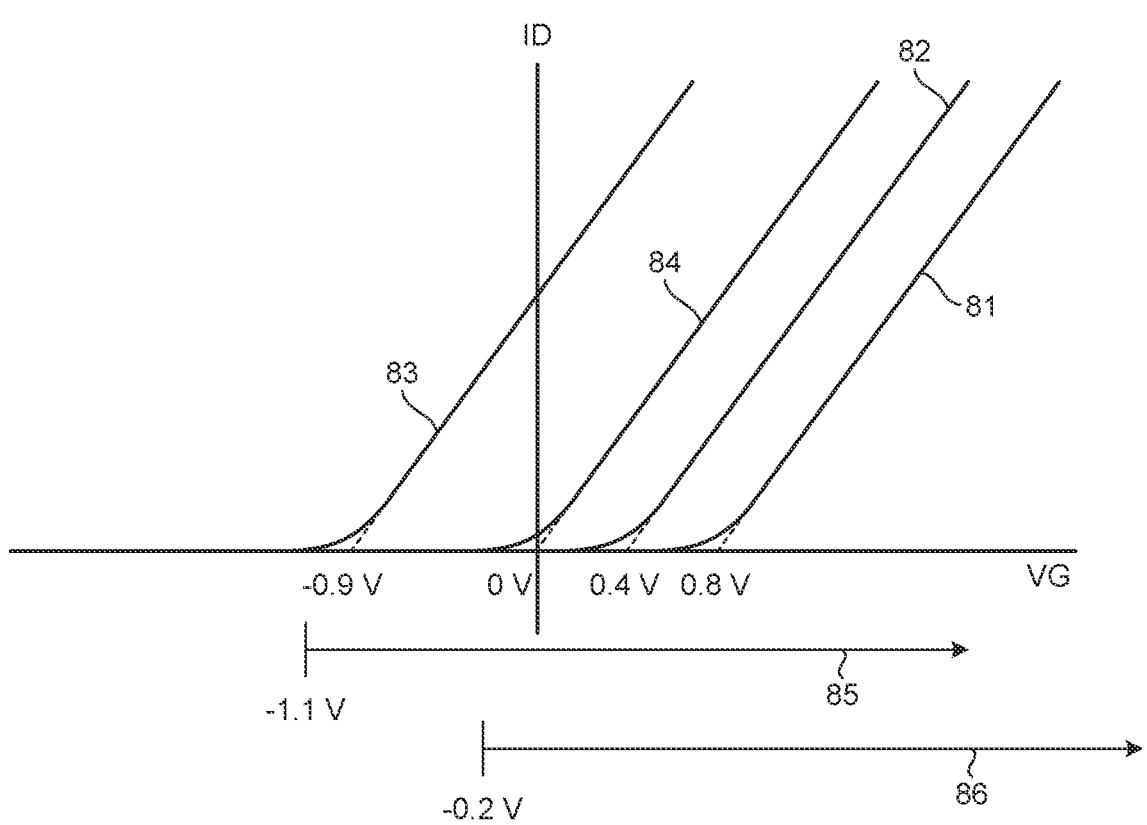
FIG. 9 is a diagram illustrating a VG-ID characteristic of NMOS transistors.

FIG. 9 is a diagram illustrating gate voltage (VG)-drain current (ID) characteristic of NMOS transistors. A waveform 81 is a waveform representing a VG-ID characteristic of the transistors Tr5 and Tr6 that are ordinary NMOS transistors. A waveform 82 is a waveform representing a VG-ID characteristic of the transistors Tr15 and Tr16 that are low Vth NMOS transistors.

The threshold voltage Vth is a gate voltage at which a drain current ID starts to flow (the transistor is turned on). The threshold voltage Vth of the transistors Tr5 and Tr6 that are ordinary NMOS transistors is 0.8 V and the threshold voltage Vth of the transistors Tr15 and Tr16 that are low Vth NMOS transistors is 0.4 V.

With reference to FIG. 7 again, in the pixel Pix of the comparative example, the output voltage is in the range of 1.9 V to 4.0 V for the input voltage in the range of 0 V to 3 V. The output voltage is the voltage at the pixel electrode PE in the configuration of the pixel Pix illustrated in FIG. 4, but is, at the same time, the voltage at the output terminal a of the source follower circuit 61 or the output terminal b of the source follower circuit 62. That is, the output voltage of the pixel Pix just corresponds to the voltage at the output terminal a or the output terminal b applied to the pixel electrode PE by conduction between the source terminal and the drain terminal of the transistor Tr5 or Tr6. Therefore, the output voltage of the pixel Pix is in the range of 1.9 V to 4.0 V and the dynamic range is 2.1 V.

As described above, the low Vth NMOS transistors have large leakage currents. The leakage currents become large in a case in which the gate voltage is off (0 V), the source voltage is 0 V, and the drain voltage is 0 V or more.

In a mode of use as the pixel Pix1, in the transistors Tr15 and Tr16, a source voltage (a voltage at the output terminals a and b) is in a range of 1.9 V to 4.0 V and a drain voltage (a voltage at the pixel electrode PE) in also a range of 1.9 V to 4.0 V. That is, the source voltage and the drain voltage of the transistors Tr15 and Tr16 are both voltages higher than 0 V. Therefore, even if there is some leakage current in the transistors Tr15 and Tr16, the transistors Tr15 and Tr16 are capable of serving properly as switches.

When the threshold voltage Vth of the transistors Tr15 and Tr16 is low, in a case in which the gate voltage is on (5.5 V), a high voltage applied to the source terminal can be conducted to the drain terminal. Reasons therefor are as follows.

The transistors Tr5 and Tr6 in the pixel Pix of the comparative example are ordinary NMOS transistors. Therefore, even if the voltage at the output terminals a and b of the source follower circuits 61 and 62 is increased, the transistors Tr5 and Tr6 are able to conduct only a voltage obtained by subtraction of the threshold voltage Vth from 5.5 V, that is, a voltage of (5.5V−Vth) or less, to the pixel electrode PE. Furthermore, since the substrate effect is generated in the transistors Tr5 and Tr6, the threshold voltage Vth increases by about 0.7 V from 0.8 V due to the substrate effect to thereby be 1.5V. Therefore, as described already, the transistors Tr5 and Tr6 can conduct only a voltage of 4.0 V (=5.5V−1.5 V) or less to the pixel electrode PE. As described already, the dynamic range of the output voltage of the pixel Pix thereby becomes 2.1 V.

By contrast, the threshold voltage Vth of the transistors Tr15 and Tr16 is 0.4 V. Furthermore, the transistors Tr15 and Tr16 are NMOSs, and in a case in which the source voltage and the drain voltage are higher than the well voltage (0 V), the substrate effect is generated. Therefore, the threshold voltage Vth of the transistors Tr15 and Tr16 increases by about 0.7 V from 0.4 V due to the substrate effect to thereby be 1.1 V. Therefore, the transistors Tr15 and Tr16 can conduct a voltage of 4.4 V (=5.5V−1.1 V) or less to the pixel electrode PE.

A waveform 72 in FIG. 7 is a waveform representing a relationship between the input voltage and the output voltage of the pixel Pix1 in the second embodiment. The transistors Tr15 and Tr16 can conduct a voltage in a range of 1.9 V to 4.4 V to the pixel electrode PE, for the input voltage in a range of 0 V to 4 V. Therefore, in contrast with the pixel Pix of the comparative example, the pixel Pix1 can increase the dynamic range to 2.5 V between 1.9 V and 4.4 V. Thus in the pixel Pix1, reduction in contrast can be suppressed, and reduction in brightness can be suppressed. Furthermore, in the pixel Pix1, a reflection angle of a reflected light can be widen.

By applying the reflective liquid crystal display device of the second embodiment in which reduction in contrast can be suppressed and reduction in brightness can be suppressed to the WSS array 10 of the first embodiment, reduction in contrast of the output beams 31a to 31c (see FIG. 1) can be suppressed, and reduction in brightness can be suppressed. Thus in the WSS array 10, signal/noise (S/N) ratios of the wavelength channels can be improved.

Furthermore, by applying the reflective liquid crystal display device of the second embodiment in which a reflection angle of a reflected light can be widen to the WSS array 10 of the first embodiment, the spatial interval between the output beams 31a to 31c (see FIG. 1) can be widen. Thus in the WSS array 10, signal/noise (S/N) ratios of the wavelength channels can be improved. Or, in the WSS array 10, a new output beam can be output while maintaining the spatial interval between the output beams 31a to 31c. Thus in the WSS array 10, the number of wavelength channels can be increased.

Third Embodiment

Figure 10:
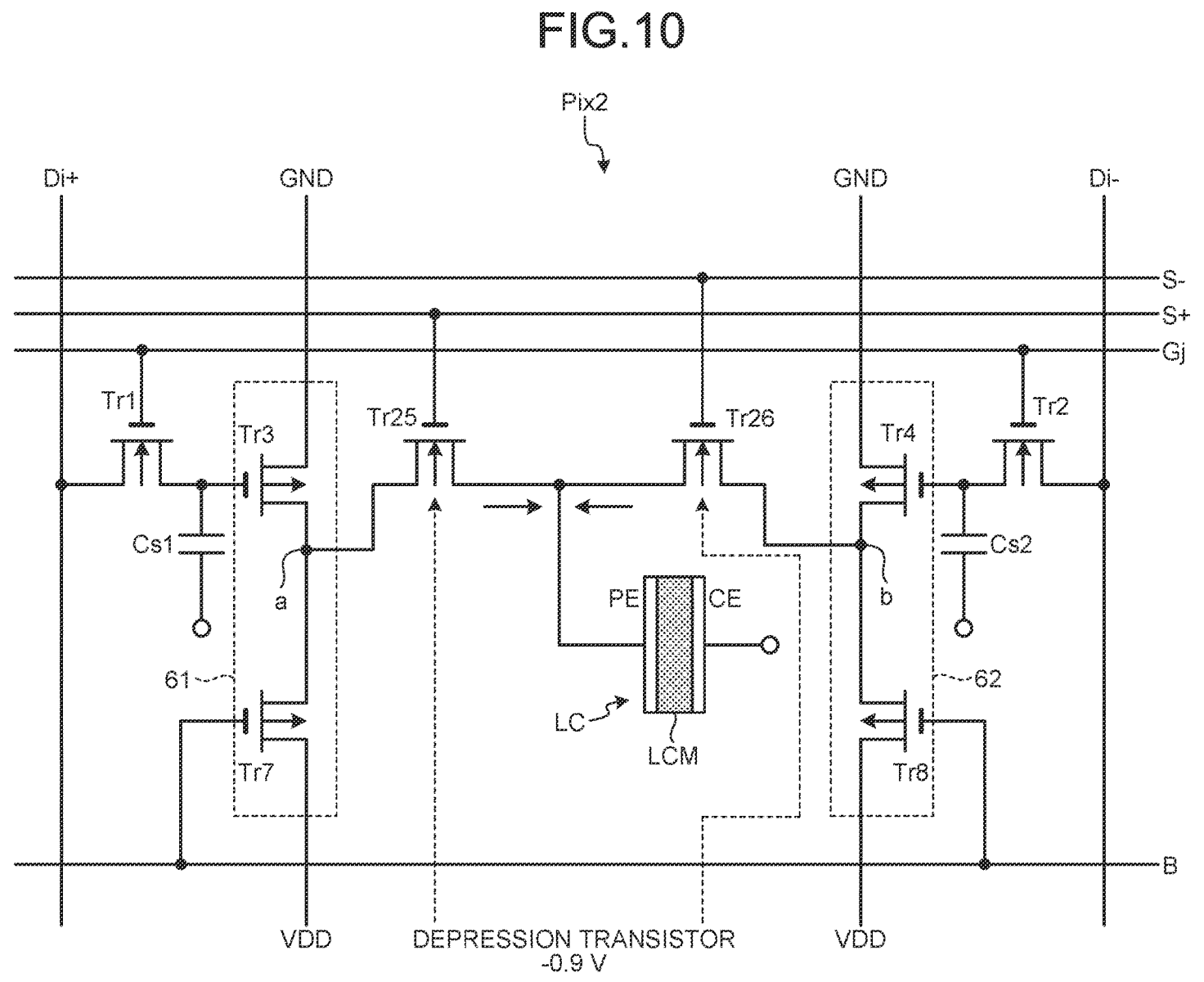

FIG. 10 is a diagram illustrating a configuration of a pixel of a reflective liquid crystal display device of a third embodiment.

For components of a pixel Pix2 of the reflective liquid crystal display device of the third embodiment, the same reference signs will be assigned to the components that are the same as those of the pixel Pix of the comparative example or the pixel Pix1 of the second embodiment, and description thereof will be omitted.

The pixel Pix2 includes transistors Tr25 and Tr26 instead of the transistors Tr5 and Tr6, in contrast with the pixel Pix.

The transistor Tr25 corresponds to an example of the "fifth transistor" of the present application. The transistor Tr26 corresponds to an example of the "sixth transistor" of the present application.

The transistors Tr25 and Tr26 are depression NMOS transistors. The transistors Tr25 and Tr26 have a threshold voltage Vth in a range of 0 V or less, for example, of about –0.9 V, but the present application is not limited to this example.

The lowest voltage of the source voltage (the voltage at the output terminals a and b) and the drain voltage (the voltage at the pixel electrode PE) of the transistors Tr25 and Tr26 is 1.9 V. Therefore, the transistors Tr25 and Tr26 just need to have no leakage of 1.9 V between the source and the drain in a case in which the gate voltage is off (0 V).

With reference to FIG. 9 again, a waveform 83 is a waveform representing a VG-ID characteristic of the transistors Tr25 and Tr26 that are depression NMOS transistors.

The threshold voltage Vth of the transistors Tr5 and Tr6 that are ordinary NMOS transistors is 0.8 V and the threshold voltage Vth of the transistors Tr25 and Tr26 that are depression NMOS transistors is –0.9 V.

Furthermore, an arrow 85 represents a range of the gate voltage (VG) in which the transistors Tr25 and Tr26 can be turned on. An ordinary NMOS transistor is brought into an off-state when the gate voltage is less than 0.8 V in a case in which the source voltage and the drain voltage are 0 V. By contrast, the lowest voltage of the source voltage and the drain voltage of the transistors Tr25 and Tr26 that are depression NMOS transistors is 1.9 V. Therefore, the transistors Tr25 and Tr26 are brought into the off-state when the gate voltage is –1.1 V (=–1.9 V+0.8 V) in a case in which the source voltage and the drain voltage are calculated to be 0 V.

Practically, the substrate effect generated in the transistors Tr25 and Tr26 needs to be considered.

Figure 11:
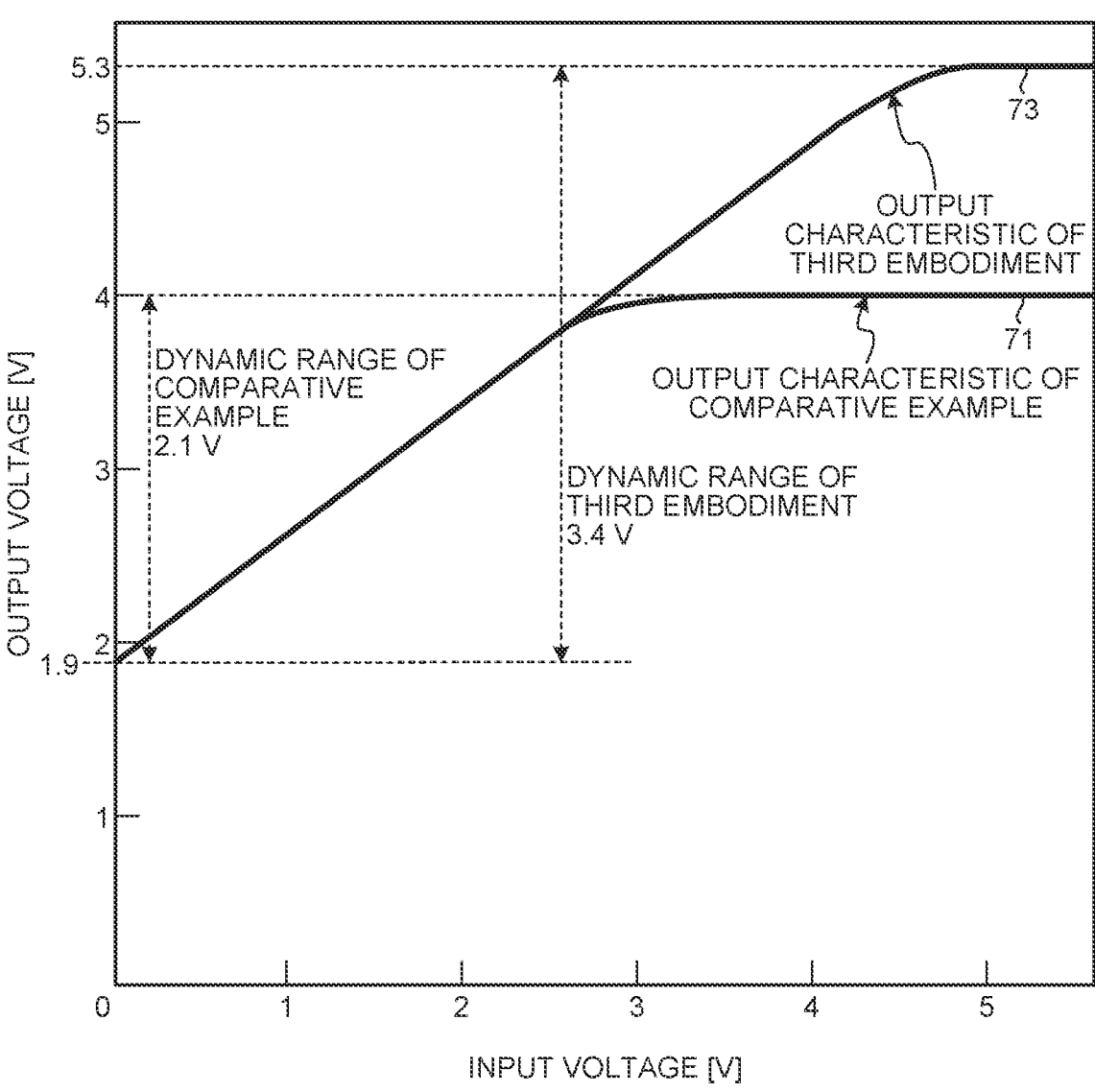
FIG. 11 is a diagram illustrating a relationship between an input voltage and an output voltage of the pixels of the comparative example and the third embodiment.

Therefore, the threshold voltage Vth of the transistors Tr25 and Tr26 is set in consideration of the substrate effect. In this third embodiment, the threshold voltage Vth of the transistors Tr25 and Tr26 is set at –0.9 V. FIG. 11 is a diagram illustrating a relationship between the input voltage and the output voltage of the pixels in the comparative example and the third embodiment.

The waveform 71 is a waveform representing a relationship between the input voltage and the output voltage in the pixel Pix of the reflective liquid crystal display device of the comparative example. A waveform 73 is a waveform representing a relationship between the input voltage and the output voltage of the pixel Pix2 in the reflective liquid crystal display device of the third embodiment.

The output voltage of the pixel Pix of the comparative example is in the range of 1.9 V to 4.0 V for the input voltage in the range of 0 V to 3 V. The output voltage is the voltage at the pixel electrode PE in the configuration of the pixel Pix illustrated in FIG. 4, but is, at the same time, the voltage at the output terminal a of the source follower circuit 61 or the voltage at the output terminal b of the source follower circuit 62. That is, the output voltage of the pixel Pix just corresponds to the voltage at the output terminal a or the output terminal b applied to the pixel electrode PE by conduction between the source terminal and the drain terminal of the transistor Try or Tr6. Therefore, the output voltage of the pixel Pix is in the range of 1.9 V to 4.0 V and the dynamic range is 2.1 V.

By contrast, in the transistors Tr25 and Tr26 having the threshold voltage Vth of –0.9 V, in a case in which the voltage at the output terminals a and b of the source follower circuits 61 and 62 or the voltage at the pixel electrode PE is high, the threshold voltage Vth with the substrate effect becomes 0.2 V. Therefore, the transistors Tr25 and Tr26 can conduct a voltage of 5.3 V (=5.5V–0.2 V) or less to the pixel electrode PE.

As represented by the waveform 73, the transistors Tr25 and Tr26 can conduct the voltage in a range of 1.9 V to 5.3 V to the pixel electrode PE, for the input voltage in a range of 0 V to 4.5 V. Therefore, in the pixel Pix2, the dynamic range can be widen to 3.4 V between 1.9 V and 5.3 V, for the input voltage in the range of 0 V to 4.5 V.

In the pixel Pix2, the output voltage in the range of 1.9 V to 5.3 V can be switched properly without leaking, and the dynamic range thereof can be widen compared to that of the pixel Pix of the comparative example. Thus in the pixel Pix2, reduction in contrast can be suppressed and reduction in brightness can be suppressed. Furthermore, in the pixel Pix2, a reflection angle of a reflected light can be widen.

Fourth Embodiment

Figure 12:
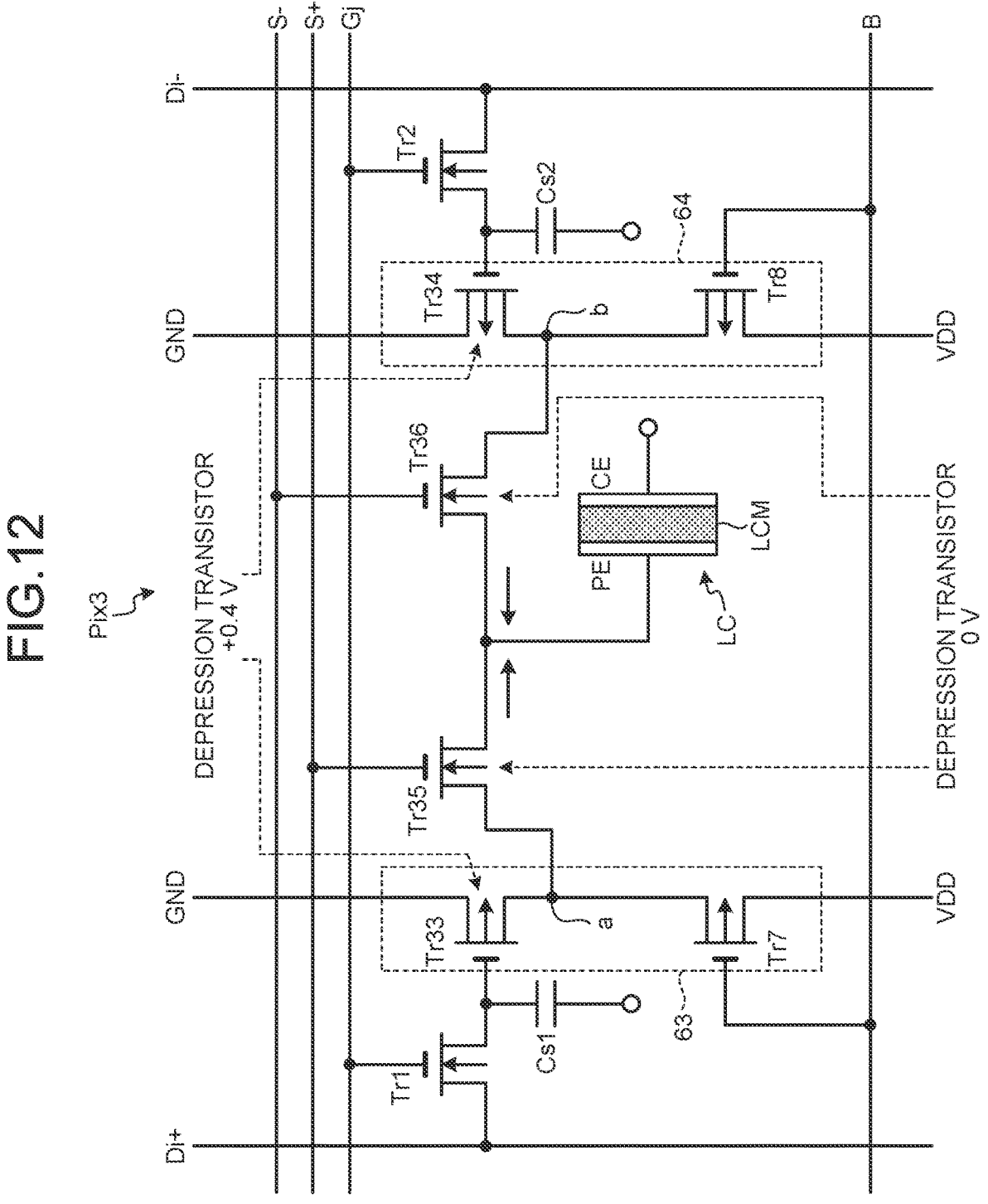
FIG. 12 is a diagram illustrating a configuration of a pixel of a reflective liquid crystal display device of a fourth embodiment.

FIG. 12 is a diagram illustrating a configuration of a pixel of a reflective liquid crystal display device of a fourth embodiment.

For components of a pixel Pix3 of the reflective liquid crystal display device of the fourth embodiment, the same reference signs will be assigned to the components that are the same as those of the pixel Pix of the comparative example, the pixel Pix1 of the second embodiment, or the pixel Pix2 of the third embodiment, and description thereof will be omitted.

The pixel Pix3 includes transistors Tr35 and Tr36 instead of the transistors Try and Tr6, in contrast with the pixel Pix.

The transistor Tr35 corresponds to an example of the "fifth transistor" of the present application. The transistor Tr36 corresponds to an example of the "sixth transistor" of the present application.

The transistors Tr35 and Tr36 are depression NMOS transistors. The transistors Tr35 and Tr36 have a threshold voltage Vth in a range of 0 V or less, for example, of about 0 V, but the present application is not limited to this example.

Furthermore, the pixel Pix3 includes source follower circuits 63 and 64, instead of the source follower circuits 61 and 62, in contrast with the pixel Pix. The source follower circuit 63 includes a transistor Tr33 instead of the transistor Tr3, in contrast with the source follower circuit 61. The source follower circuit 64 includes a transistor Tr34 instead of the transistor Tr4, in contrast with the source follower circuit 62.

The transistor Tr33 corresponds to an example of the "third transistor" of the present application. The transistor Tr34 corresponds to an example of the "fourth transistor" of the present application.

The transistors Tr33 and Tr34 are depression PMOS transistors. The transistors Tr33 and Tr34 have a threshold voltage Vth in a range of 0 V or more, for example, of about +0.4 V, but the present application is not limited to this example.

In this fourth embodiment, the transistors Tr33 and Tr34 are depression PMOS transistors, but the present application is not limited to this example. The transistors Tr33 and Tr34 may be low Vth PMOS transistors. The low Vth PMOS transistor is a transistor in which the threshold voltage Vth is changed in a positive direction, in contrast with an ordinary PMOS transistor.

The transistors Tr33 and Tr34 have the threshold voltage of +0.4 V through ion implantation to their channel portions. Since the threshold voltage Vth is +0.4 V, the transistors Tr33 and Tr34 are in a normally on state in which conduction is achieved between the source and the drain even when the gate voltage is turned off (0 V).

The holding capacitor Cs1 and the holding capacitor Cs2 are respectively connected to the gate terminals of the transistors Tr33 and Tr34, and the gate terminals are fixed at a pixel signal voltage. Therefore, the transistors Tr33 and Tr34 that function as signal input transistors will not perform on-off control of current between the source and the drain with the gate voltage. A signal that implements the on-off control of the current between the source and the drain of the transistors Tr33 and Tr34 is a gate bias control signal that is supplied to the wiring B connected to the gate terminals of transistors Tr7 and Tr8 that function as constant current load transistors. Therefore, since the transistors Tr33 and Tr34 just need to be able to control a resistance value between the source and the drain by the gate voltage, even if the gate voltage is 5.5 V, the current between the source and the drain does not need to be turned off. In the transistors Tr33 and Tr34, nonlinearity in a voltage region in which the gate voltage is high can be avoided.

Furthermore, since the transistors Tr33 and Tr34 are depression transistors, the source follower circuits 63 and 64 have an offset voltage of 1.0 V. The lowest voltage of the source voltage (the voltage at the output terminals a and b) and the drain voltage (the voltage at the pixel electrode PE) of the transistors Tr35 and Tr36 thereby becomes 1.0 V. Therefore, the transistors Tr35 and Tr36 just need to have no leakage of 1.0 V between the source and the drain in a case in which the gate voltage is off (0 V).

With reference to FIG. 9 again, a waveform 84 is a waveform representing a VG-ID characteristic of the transistors Tr35 and Tr36 that are depression NMOS transistors. While the threshold voltage Vth of the transistors Try and Tr6 that are ordinary NMOS transistors is 0.8 V, the threshold voltage Vth of the transistors Tr35 and Tr36 that are depression NMOS transistors is 0 V.

Furthermore, an arrow 86 represents a range of the gate voltage (VG) in which the transistors Tr35 and Tr36 can be turned on. An ordinary NMOS transistor is brought into the off-state when the gate voltage is less than 0.8 V in a case in which the source voltage and the drain voltage are 0 V. By contrast, the lowest voltage of the source voltage and the drain voltage of the transistors Tr35 and Tr36 that are depression NMOS transistors is 1.0 V. Therefore, the transistors Tr35 and Tr36 are brought into the off-state when the gate voltage is less than –0.2 V (=–1.0 V+0.8 V) in a case in which the source voltage and the drain voltage are calculated to be 0 V.

Practically, the substrate effect generated in the transistors Tr35 and Tr36 needs to be considered. Therefore, the threshold voltage Vth of the transistors Tr35 and Tr36 is set in consideration of the substrate effect. In the present application, the threshold voltage Vth of the transistors Tr35 and Tr36 is set at 0 V.

Figure 13:
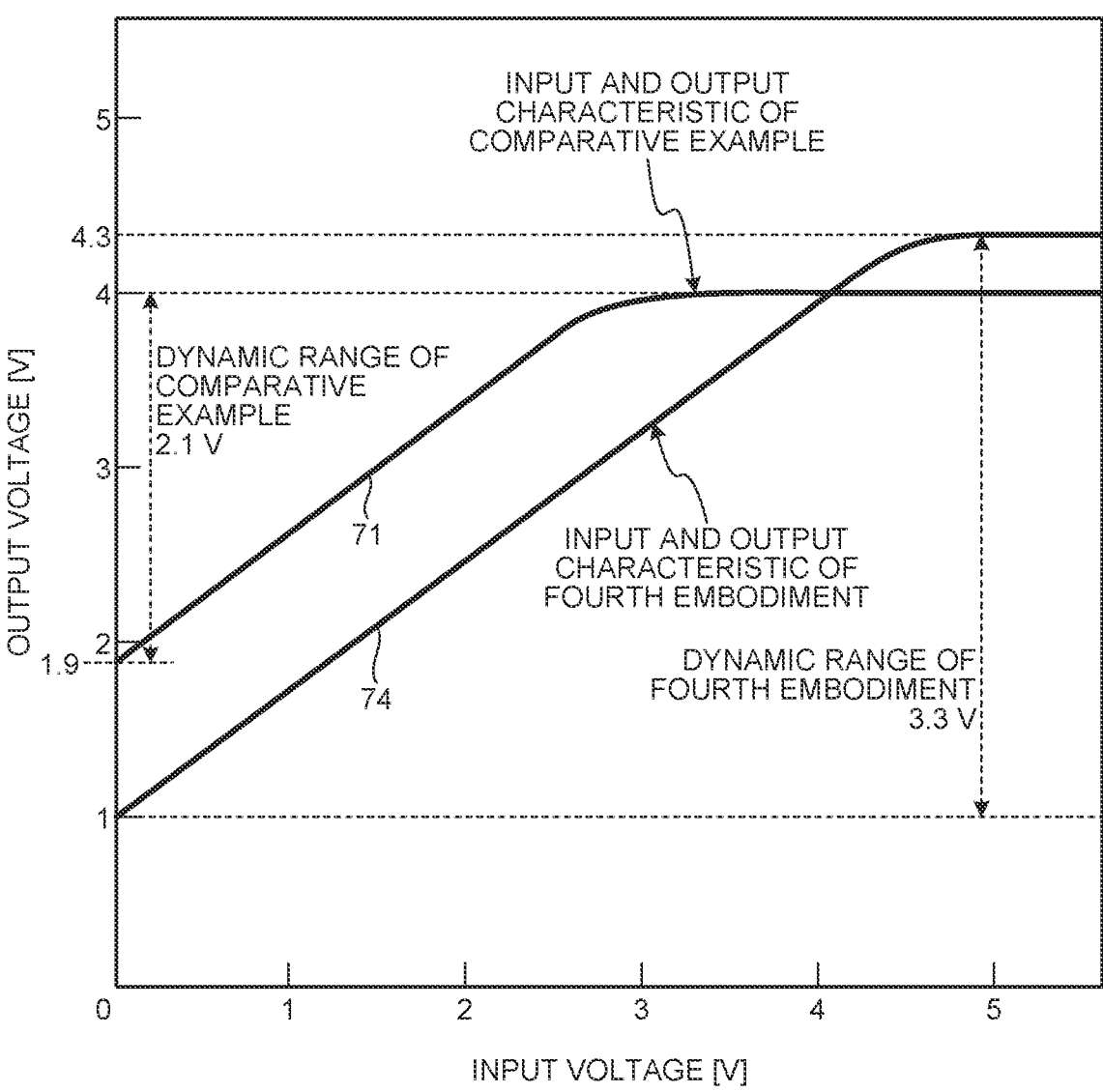
FIG. 13 is a diagram illustrating a relationship between an input voltage and an output voltage of the pixels of the comparative example and the fourth embodiment.

FIG. 13 is a diagram illustrating a relationship between the input voltage and the output voltage of the pixels in the comparative example and the fourth embodiment.

The waveform 71 is a waveform representing a relationship between the input voltage and the output voltage of the pixel Pix of the comparative example. A waveform 74 is a waveform representing the relationship between the input voltage and the output voltage of the pixel Pix3 of the fourth embodiment.

The output voltage of the pixel Pix of the comparative example is in the range of 1.9 V to 4.0 V for the input voltage in the range of 0 V to 3 V. The output voltage is the voltage at the pixel electrode PE in the configuration of the pixel Pix illustrated in FIG. 4, but is, at the same time, the voltage at the output terminal a of the source follower circuit 61 or the output terminal b of the source follower circuit 62. That is, the output voltage of the pixel Pix just corresponds to the voltage at the output terminal a or the output terminal b applied to the pixel electrode PE by conduction between the source terminal and the drain terminal of the transistor Try or Tr6. Therefore, the output voltage of the pixel Pix is in the range of 1.9 V to 4.0 V and the dynamic range is 2.1 V. By contrast, in the transistors Tr35 and Tr36 having the threshold voltage Vth of 0 V, in a case in which the voltage at the output terminals a and b of the source follower circuits 63 and 64 or the voltage at the pixel electrode PE is high, the threshold voltage Vth with the substrate effect becomes 1.2 V. Therefore, the transistors Tr35 and Tr36 can conduct a voltage of 4.3 V (=5.5V–1.2 V) or less to the pixel electrode PE.

As represented by the waveform 74, the transistors Tr35 and Tr36 can conduct the voltage in a range of 1.0 V to 4.3 V to the pixel electrode PE, for the input voltage in a range of 0 V to 4.5 V. Therefore, in the pixel Pix3, the dynamic range can be widen to 3.3 V between 1.0 V and 4.3 V, for the input voltage in the range of 0 V to 4.5 V.

In the pixel Pix3, the output voltage in the range of 1.0 V to 4.3 V can be switched properly without leaking, and the dynamic range thereof can be widen compared to that of the pixel Pix of the comparative example. Thus in the pixel Pix3, reduction in contrast can be suppressed and reduction in brightness can be suppressed. Furthermore, in the pixel Pix2, a reflection angle of a reflected light can be widen.

Fifth Embodiment

Figure 14:
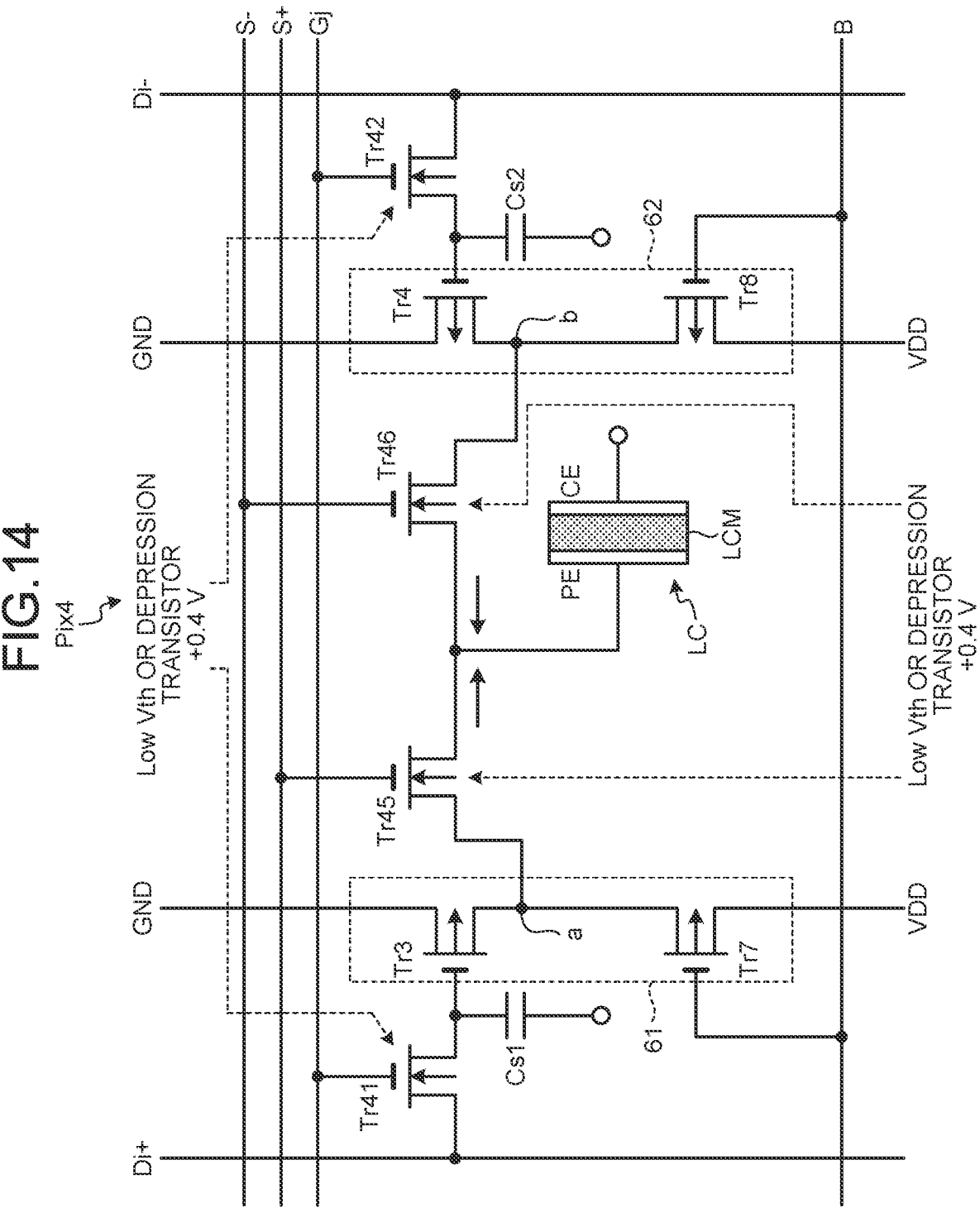
FIG. 14 is a diagram illustrating a configuration of a pixel of a reflective liquid crystal display device of a fifth embodiment.

FIG. 14 is a diagram illustrating a configuration of a pixel of a reflective liquid crystal display device of a fifth embodiment.

For components of a pixel Pix4 of the reflective liquid crystal display device of the fifth embodiment, the same reference signs will be assigned to the components that are the same as those of the pixel Pix of the comparative example or the pixels Pix1 to Pix3 of the second to fourth embodiments, and description thereof will be omitted.

The pixel Pix4 includes transistors Tr41 and Tr42 instead of the transistors Tr1 and Tr2, in contrast with the pixel Pix.

The transistor Tr41 corresponds to an example of the "first transistor" of the present application. The transistor Tr42 corresponds to an example of the "second transistor" of the present application.

The transistors Tr41 and Tr42 are low Vth or depression NMOS transistors. The transistors Tr41 and Tr42 have a threshold voltage Vth of about +0.4 V in a case in which they are low Vth transistors, for example, but the present application is not limited to this example.

Furthermore, the pixel Pix4 includes transistors Tr45 and Tr46 instead of the transistors Try and Tr6, in contrast with the pixel Pix.

The transistor Tr45 corresponds to an example of the "fifth transistor" of the present application. The transistor Tr46 corresponds to an example of the "sixth transistor" of the present application.

The transistors Tr45 and Tr46 are low Vth or depression NMOS transistors. The transistors Tr45 and Tr46 have a threshold voltage Vth of about +0.4 V in a case in which they are low Vth transistors, for example, but the present application is not limited to this example.

The lowest voltage of the source voltage (the voltage at the output terminals a and b) and the drain voltage (the voltage at the pixel electrode PE) at the transistors Tr45 and Tr46 is 1.9 V. Therefore, the transistors Tr45 and Tr46 just need to have no leakage of 1.9 V between the source and the drain in a case in which the gate voltage is off (0 V).

The transistors Tr41 and Tr42 are low Vth or depression NMOS transistors. That is, the threshold voltage Vth of the transistors Tr41 and Tr42 is less than that of the transistors Tr1 and Tr2. Therefore, in contrast with the transistors Tr1 and Tr2, the transistors Tr41 and Tr42 can conduct a high voltage supplied to the positive polarity pixel data line Di+ and the negative polarity pixel data line Di−. That is, the transistors Tr41 and Tr42 can conduct a high voltage applied to the source terminals, to the drain terminals in a case in which a scan pulse supplied to a row scan line Gj is on (5.5 V).

By contrast, the transistors Tr1 and Tr2 in the pixel Pix of the comparative example are ordinary NMOS transistors. The threshold voltage Vth of the transistors Tr1 and Tr2 increases by about 0.7 V from 0.8 V due to the substrate effect to thereby be 1.5 V. Therefore, the highest voltage that can be conducted between the source terminals and drain terminals of the transistors Tr1 and Tr2 is a voltage obtained by subtraction of the threshold voltage of 1.5 V from 5.5 V, that is, 4.0 V (=5.5V−1.5 V). That is, even in a case in which a high voltage is supplied to the positive polarity pixel data line Di+ and the negative polarity pixel data line Di−, the maximum voltage that can be conducted to the holding capacitor Cs1 and the holding capacitor Cs2 by the transistors Tr1 and Tr2 becomes 4 V.

Furthermore, in a case in which the threshold voltage Vth of the transistors Tr45 and Tr46 is a low Vth of +0.4 V, the threshold voltage Vth of the transistors Tr45 and Tr46 increases by about 0.7 V from 0.4 V due to the substrate effect to thereby be 1.1 V. Therefore, the transistors Tr45 and Tr46 can conduct a voltage of 4.4 V (=5.5V−1.1 V) or less to the pixel electrode PE.

Figure 15:
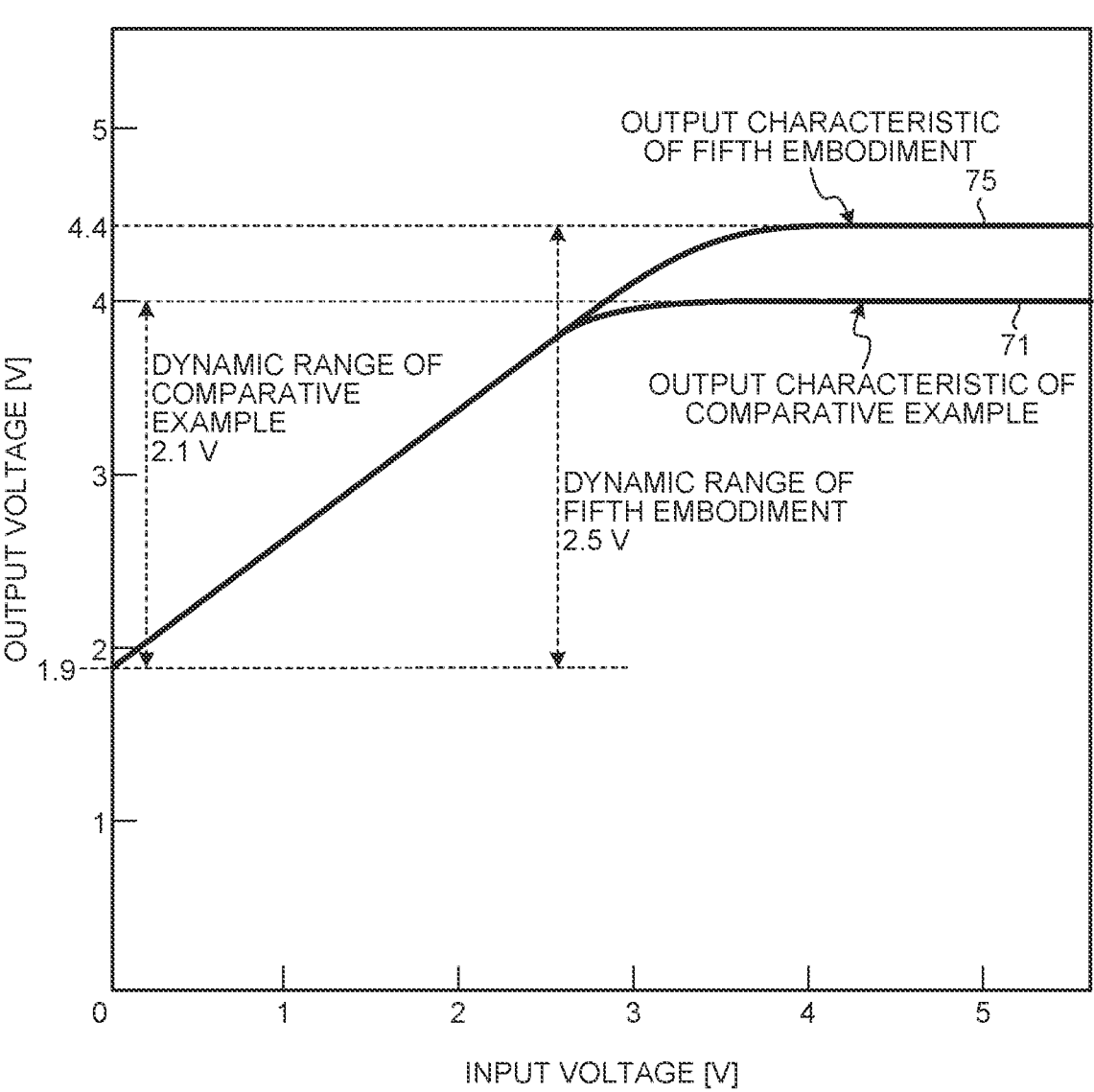
FIG. 15 is a diagram illustrating a relationship between an input voltage and an output voltage of the pixels of the comparative example and the fifth embodiment.

FIG. 15 is a diagram illustrating a relationship between the input voltage and the output voltage of the pixels in the comparative example and the fifth embodiment.

The waveform 71 is a waveform representing a relationship between the input voltage and the output voltage of the pixel Pix of the comparative example. A waveform 75 is a waveform representing a relationship between the input voltage and the output voltage of the pixel Pix4 of the fifth embodiment.

In a case in which the threshold voltage Vth of the transistors Tr45 and Tr46 that are low Vth transistors is +0.4 V, the threshold voltage Vth of the transistors Tr45 and Tr46 increases by about 0.7 V from 0.4 V due to the substrate effect to thereby be 1.1V. Therefore, the maximum voltage that can be conducted to the holding capacitor Cs1 and the holding capacitor Cs2 by the transistors Tr45 and Tr46 from the positive polarity pixel data line Di+ and the negative polarity pixel data line Di− becomes 4.4 V (=5.5V−1.1 V).

Therefore, in a case in which a voltage from 0 V to 5 V is supplied to the positive polarity pixel data line Di+ and the negative polarity pixel data line Di−, a voltage that can be conducted to the holding capacitor Cs1 and the holding capacitor Cs2 is 0 V to 4.4 V. The voltage held at the holding capacitor Cs1 and the holding capacitor Cs2 is level-shifted (added with an offset voltage) by the source follower circuits 61 and 62. The transistors Tr45 and Tr46 then can conduct a voltage of 4.4 V or less to the pixel electrode PE. Therefore, the voltage applied to the pixel electrode PE is 1.9 V to 4.4 V.

A switch arranged in a pixel data line drive circuit for supplying a pixel signal to the positive polarity pixel data line Di+ and the negative polarity pixel data line Di− is a complementary switch using both an NMOS transistor and a PMOS transistor. Therefore, the switch in the pixel data line drive circuit can conduct a high voltage, in contrast with a switch having only NMOS transistors used in the pixel Pix4. Therefore, the pixel data line drive circuit can supply a pixel signal from a reference voltage (ground voltage) GND to a power supply voltage VDD, that is, from 0 V to 5.5 V, to the positive polarity pixel data lien Di+ and the negative polarity pixel data line Di−.

Since a pixel pitch needs to be small in the pixel Pix4, the switch includes only NMOS transistors.

As described above, in the pixel Pix4, the dynamic range can be widen in contrast with the pixel Pix of the comparative example. Thus in the pixel Pix4, reduction in contrast can be suppressed and reduction in brightness can be suppressed. Furthermore, in the pixel Pix4, a reflection angle of a reflected light can be widen.

The case in which the transistors Tr41, Tr42, Tr45, and Tr46 are low Vth NMOS transistors has been described with respect to the fifth embodiment. However, the transistors Tr41, Tr42, Tr45, and Tr46 may be depression NMOS transistors. In this case, the threshold voltage Vth is set in consideration of a range of the voltage of the pixel signal input to the pixel Pix4 and a switchable range.

Furthermore, the case in which the threshold voltage Vth of the transistors Tr41 and Tr42 and the threshold voltage Vth of the transistors Tr45 and Tr46 are the same has been described with respect to the fifth embodiment. However, the threshold voltage Vth of the transistors Tr41 and Tr42 and the threshold voltage Vth of the transistors Tr45 and Tr46 may be different from each other. For example, the threshold voltage Vth of the transistors Tr41 and Tr42 that are low Vth transistors may be +0.4 V, and the threshold voltage Vth of the transistors Tr45 and Tr46 that are depression transistors may be −0.9 V. In this case, the dynamic range of the pixel Pix4 can be further widen. Thus in the pixel Pix4, reduction in contrast can be further suppressed, reduction in brightness can be further suppressed, and a reflection angle of a reflected light can be further widen.

Sixth Embodiment

Figure 16:
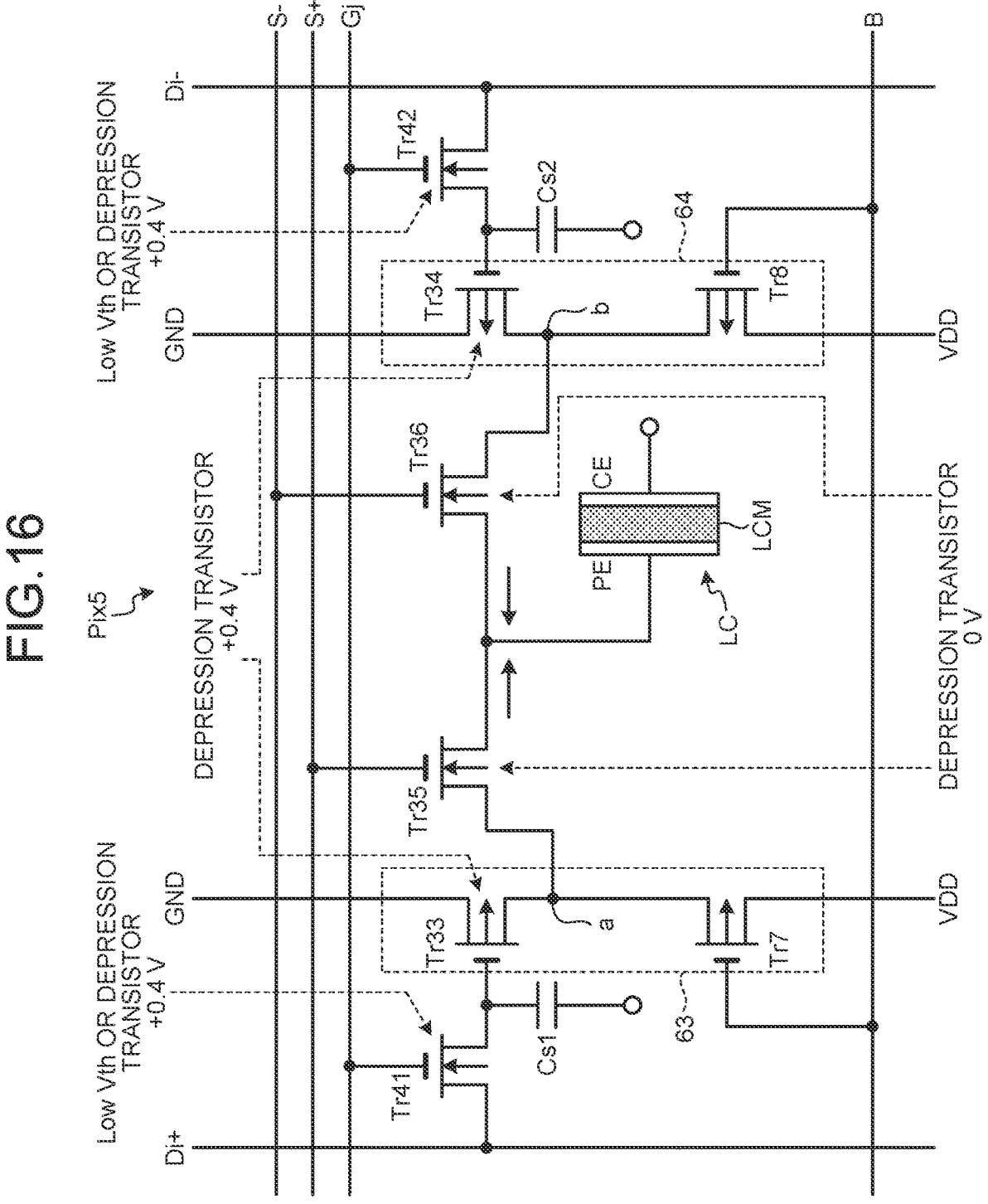
FIG. 16 is a diagram illustrating a configuration of a pixel of a reflective liquid crystal display device of a sixth embodiment.

FIG. 16 is a diagram illustrating a configuration of a pixel of a reflective liquid crystal display device of a sixth embodiment.

For components of a pixel Pix5 of the reflective liquid crystal display device of the sixth embodiment, the same reference signs will be assigned to the components that are the same as those of the pixel Pix of the comparative example or the pixels Pix1 to Pix4 of the second to fifth embodiments, and description thereof will be omitted.

The pixel Pix5 includes transistors Tr41 and Tr42 instead of the transistors Tr1 and Tr2, in contrast with the pixel Pix3 (see FIG. 12) of the fourth embodiment.

As described already with respect to the pixel Pix4 of the fifth embodiment, the transistors Tr41 and Tr42 can conduct the high voltage supplied to the positive polarity pixel data line Di+ and the negative polarity pixel data line Di−, in contrast with the transistors Tr1 and Tr2.

The transistors Tr41 and Tr42 have a threshold voltage Vth lower than the threshold voltage Vth of the transistors Tr1 and Tr2. Therefore, the transistors Tr41 and Tr42 can conduct a high voltage applied to the source terminals to the drain terminals, in a case in which the voltage at the gate terminals is on (5.5 V).

Transistors Tr35 and Tr36 are NMOS transistors, and in a case in which the source voltage and the drain voltage are higher than the well voltage (0 V), the substrate effect is generated and the threshold voltage Vth is thus increased.

In the pixel Pix of the comparative example, the transistors Tr1 and Tr2 are ordinary NMOS transistors. The threshold voltage Vth of the transistors Tr1 and Tr2 increases by about 0.7 V from 0.8 V due to the substrate effect to thereby be 1.5 V. Therefore, the highest voltage that can be conducted between the source terminals and the drain terminals of the transistors Tr1 and Tr2 is a voltage obtained by subtraction of the threshold voltage of 1.5 V from 5.5 V, that is, 4.0 V (=5.5V−1.5 V). That is, even in a case in which a high voltage is supplied to the positive polarity pixel data line Di+ and the negative polarity pixel data line Di−, the maximum voltage that can be conducted to the holding capacitor Cs1 and the holding capacitor Cs2 by the transistors Tr1 and Tr2 becomes 4 V.

Figure 17:
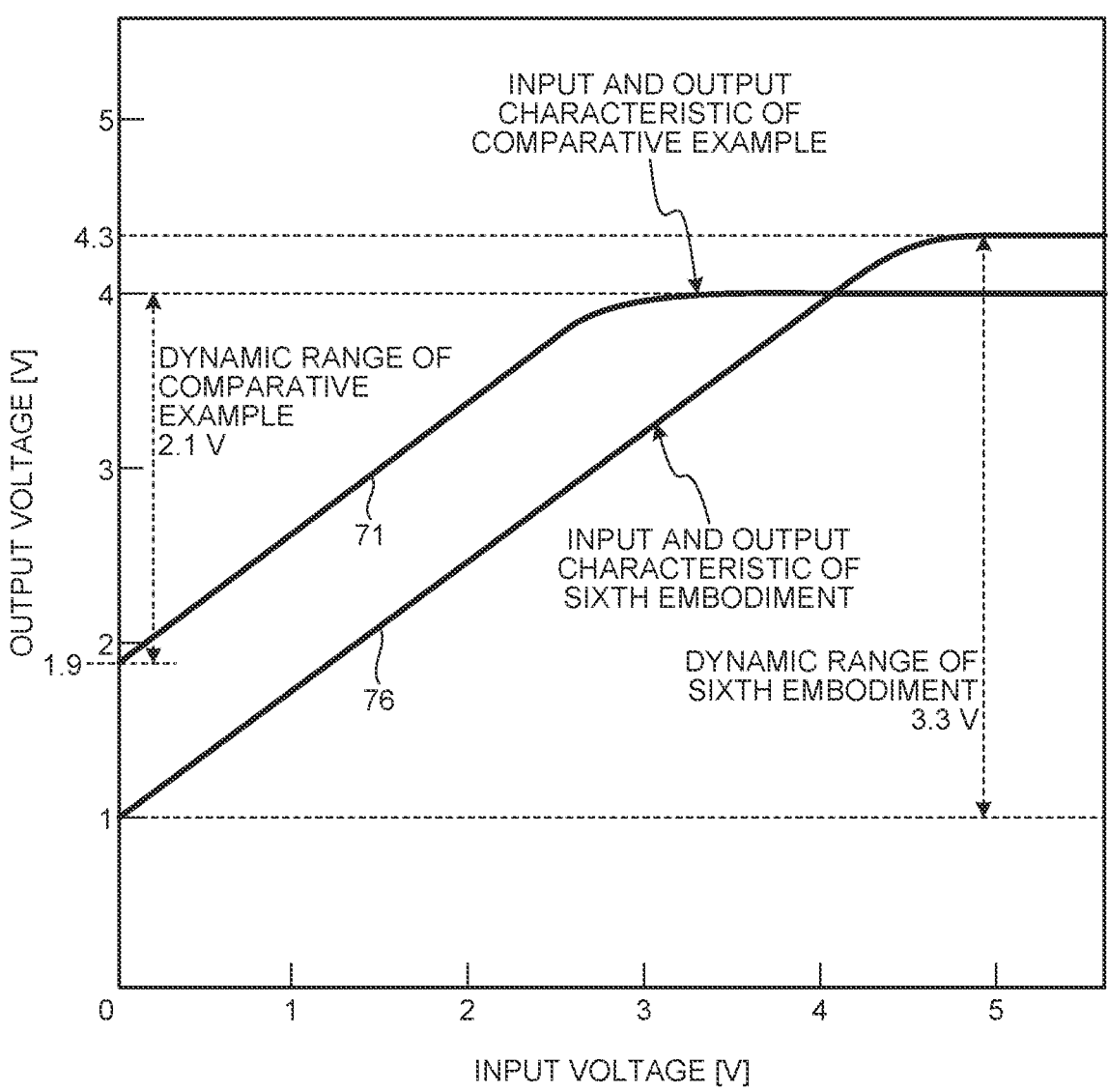
FIG. 17 is a diagram illustrating a relationship between an input voltage and an output voltage of the pixels of the comparative example and the sixth embodiment.

FIG. 17 is a diagram illustrating a relationship between an input voltage and an output voltage of the pixels of the comparative example and the sixth embodiment.

The waveform 71 is the waveform representing the relationship between the input voltage and the output voltage of the pixel Pix of the comparative example. A waveform 76 is a waveform representing a relationship between the input voltage and the output voltage of the pixel Pixy of the sixth embodiment.

The output voltage of the pixel Pix of the comparative example is in the range of 1.9 V to 4.0 V, for the input voltage in the range of 0 V to 3 V. The output voltage is the voltage at the a pixel electrode PE in the configuration of the pixel Pix illustrated in FIG. 4, but is, at the same time, the voltage at the output terminal a of the source follower circuit 61 or the output terminal b of the source follower circuit 62. That is, the output voltage of the pixel Pix just corresponds to the voltage at the output terminal a or the output terminal b applied to the pixel electrode PE by conduction between the source terminal and the drain terminal of the transistor Try or Tr6. Therefore, the output voltage of the pixel Pix is in the range of 1.9 V to 4.0 V and the dynamic range is 2.1 V.

By contrast, in the transistors Tr35 and Tr36 having the threshold voltage Vth of 0 V, in a case in which the voltage at the output terminals a and b of source follower circuits 63 and 64 or the voltage at the pixel electrode PE is high, the threshold voltage Vth with the substrate effect becomes 1.2 V. Therefore, the transistors Tr35 and Tr36 can conduct a voltage of 4.3 V (=5.5V−1.2 V) or less to the pixel electrode PE.

As represented by the waveform 76, the transistors Tr35 and Tr36 can conduct the voltage in a range of 1.0 V to 4.3 V to the pixel electrode PE, for the input voltage in a range of 0 V to 4.5 V. Therefore, in the pixel Pixy, the dynamic range can be widen to 3.3 V between 1.0 V and 4.3 V, for the input voltage in the range of 0 V to 4.5 V.

The transistors Tr33 and Tr34 have the threshold voltage Vth of +0.4 V through implantation of ions into their channel portions. Since the threshold voltage Vth is +0.4 V, the transistors Tr33 and Tr34 are in the normally on state in which conduction is achieved between the source and the drain even when the gate voltage is turned off (0 V).

The holding capacitor Cs1 and the holding capacitor Cs2 are respectively connected to the gate terminals of the transistors Tr33 and Tr34, and the gate electrodes are fixed at a pixel signal voltage. Therefore, the transistors Tr33 and Tr34 that function as signal input transistors will not perform on-off control of current between the source and the drain with the gate voltage. A signal that implements the on-off control of the current between the source and the drain of the transistors Tr33 and Tr34 is a gate bias control signal that is supplied to the wiring B connected to the gate terminals of transistors Tr7 and Tr8 that function as constant current load transistors. Therefore, since the transistors Tr33 and Tr34 just need to be able to control a resistance value between the source and the drain by the gate voltage, even if the gate voltage is 5.5 V, the current between the source and the drain does not need to be turned off.

Therefore in the transistors Tr33 and Tr34, nonlinearity in a voltage region in which the gate voltage is high can be avoided.

Furthermore, since the transistors Tr33 and Tr34 are depression transistors, the source follower circuits 63 and 64 have an offset voltage of 1.0 V. As a result, the lowest voltage of the source voltage (the voltage at the output terminals a and b) and the drain voltage (the voltage at the pixel electrode PE) at the transistors Tr35 and Tr36 is 1.0 V. Therefore, the transistors Tr35 and Tr36 just need to have no leakage of 1.0 V between the source and the drain in a case in which the gate voltage is off (0 V).

With reference to FIG. 9 again, the waveform 82 is a waveform representing a VG-ID characteristic of the transistors Tr41 and Tr42 that are low Vth NMOS transistors. The waveform 84 is a waveform representing a VG-ID characteristic of the transistors Tr35 and Tr36 that are depression NMOS transistors.

While the threshold voltage Vth of the transistors Tr1 and Tr2 that are ordinary NMOS transistors is 0.8 V, the threshold voltage Vth of the transistors Tr41 and Tr42 that are low Vth NMOS transistors is 0.4 V.

While the threshold voltage Vth of the transistors Try and Tr6 that are ordinary NMOS transistors is 0.8 V, the threshold voltage Vth of the transistors Tr35 and Tr36 that are depression NMOS transistors is 0 V.

Furthermore, the arrow 86 represents a range of the gate voltage (GV) in which the transistors Tr35 and Tr36 can be turned on. An ordinary NMOS transistor is brought into the off-state when the gate voltage is less than 0.8 V in a case in which the source voltage and the drain voltage are 0 V. By contrast, the lowest voltage of the source voltage and the drain voltage of the transistors Tr35 and Tr36 that are depression NMOS transistors is 1.0 V. Therefore, the transistors Tr35 and Tr36 are brought into the off-state when the gate voltage is less than −0.2 V (=−1.0 V+0.8 V) in a case in which the source voltage and the drain voltage are calculated to be 0 V.

Practically, the substrate effect generated in the transistors Tr35 and Tr36 needs to be considered. Therefore, the threshold voltage Vth of the transistors Tr35 and Tr36 is set in consideration of the substrate effect. In the present application, the threshold voltage Vth of the transistors Tr35 and Tr36 is set at 0 V.

A switch arranged in a pixel data line drive circuit for supplying a pixel signal to the positive polarity pixel data line Di+ and the negative polarity pixel data line Di− is a complementary switch using both an NMOS transistor and a PMOS transistor. Therefore, the switch in the pixel data line drive circuit can conduct a high voltage, in contrast with a switch having only NMOS transistors used in the pixel Pixy. Therefore, the pixel data line drive circuit can supply a pixel signal from a reference voltage (ground voltage) GND to a power supply voltage VDD, that is, from 0 V to 5.5 V, to the positive polarity pixel data lien Di+ and the negative polarity pixel data line Di−.

Since the pixel pitch needs to be small in the pixel Pix5, the switch includes only NMOS transistors.

As described above, in the pixel Pix5, the dynamic range can be widen in contrast with the pixel Pix of the comparative example. Thus in the pixel Pix5, reduction in contrast can be suppressed, and reduction in brightness can be suppressed. Furthermore, in the pixel Pix5, a reflection angle of a reflected light can be widen.

The case in which the transistors Tr41 and Tr42 are low Vth NMOS transistors and the transistors Tr35 and Tr36 are depression NMOS transistors has been described with respect to the sixth embodiment. Each of the transistors Tr41, Tr42, Tr35, and Tr36 is an NMOS transistor, but has a different threshold voltage Vth. This configuration makes manufacturing complicated, and thus the threshold voltages Vth of the transistors Tr41, Tr42, Tr35, and Tr36 may be unified to the same voltage while giving priority to cost.

Modified Examples of Second to Sixth Embodiments

In the second to sixth embodiments, the transistors Tr1, Tr2, Try, Tr6, Tr15, Tr16, Tr25, Tr26, Tr35, Tr36, Tr41, Tr42, Tr45, and Tr46 are NMOS transistors. Furthermore, the transistors Tr3, Tr4, Tr7, Tr8, Tr33, and Tr34 are PMOS transistors. However, the polarities of these transistors are not limited to these examples. The circuit may be formed of transistors having an opposite polarity. Of course, only some of the transistors may have the opposite polarities. In that case, according to the polarities of the transistors, the polarity of the threshold voltage Vth of the low Vth transistors and the polarity of the threshold voltage Vth of the depression transistors are changed as appropriate.

Combinations of low Vth NMOS transistors and depression NMOS transistors are not limited to those of the second to sixth embodiments. For example, a combination of the transistors Tr1 and Tr2 that are low Vth or depression NMOS transistors and the transistors Tr3 and Tr4 that are depression PMOS transistors may be available. In this case, needless to say, the threshold voltage Vth is determined as appropriate, in consideration of the amplitude of the pixel signal and the voltage at which leakage current of the transistors is generated.

Furthermore, in the second to sixth embodiments, the transistors Tr1, Tr2, Tr5, Tr6, Tr15, Tr16, Tr25, Tr26, Tr35, Tr36, Tr41, Tr42, Tr45, and Tr46 are NMOS transistors. However, these transistors are not limited to be only NMOS (PMOS) transistors.

The switches including the transistors Tr1, Tr2, Try, Tr6, Tr15, Tr16, Tr25, Tr26, Tr35, Tr36, Tr41, Tr42, Tr45, and Tr46 may be complementary switches. A complementary switch is a single switch formed of two transistors that are an NMOS transistor and a PMOS transistor. For example, the complementary switch is a switch having an input terminal formed by connection between source terminals of an NMOS transistor and a PMOS transistor and an output terminal formed by connection between drain terminals of the NMOS transistor and PMOS transistor. In a case in which the complementary switch is turned on, a power supply voltage VDD is applied to a gate terminal of the NMOS transistor and a reference voltage GND is applied to a gate terminal of the PMOS transistor. In a case in which the complementary switch is turned off, the reference voltage GND is applied to the gate terminal of the NMOS transistor and the power supply voltage VDD is applied to the gate terminal of the PMOS transistor.

Seventh Embodiment

Figure 18:
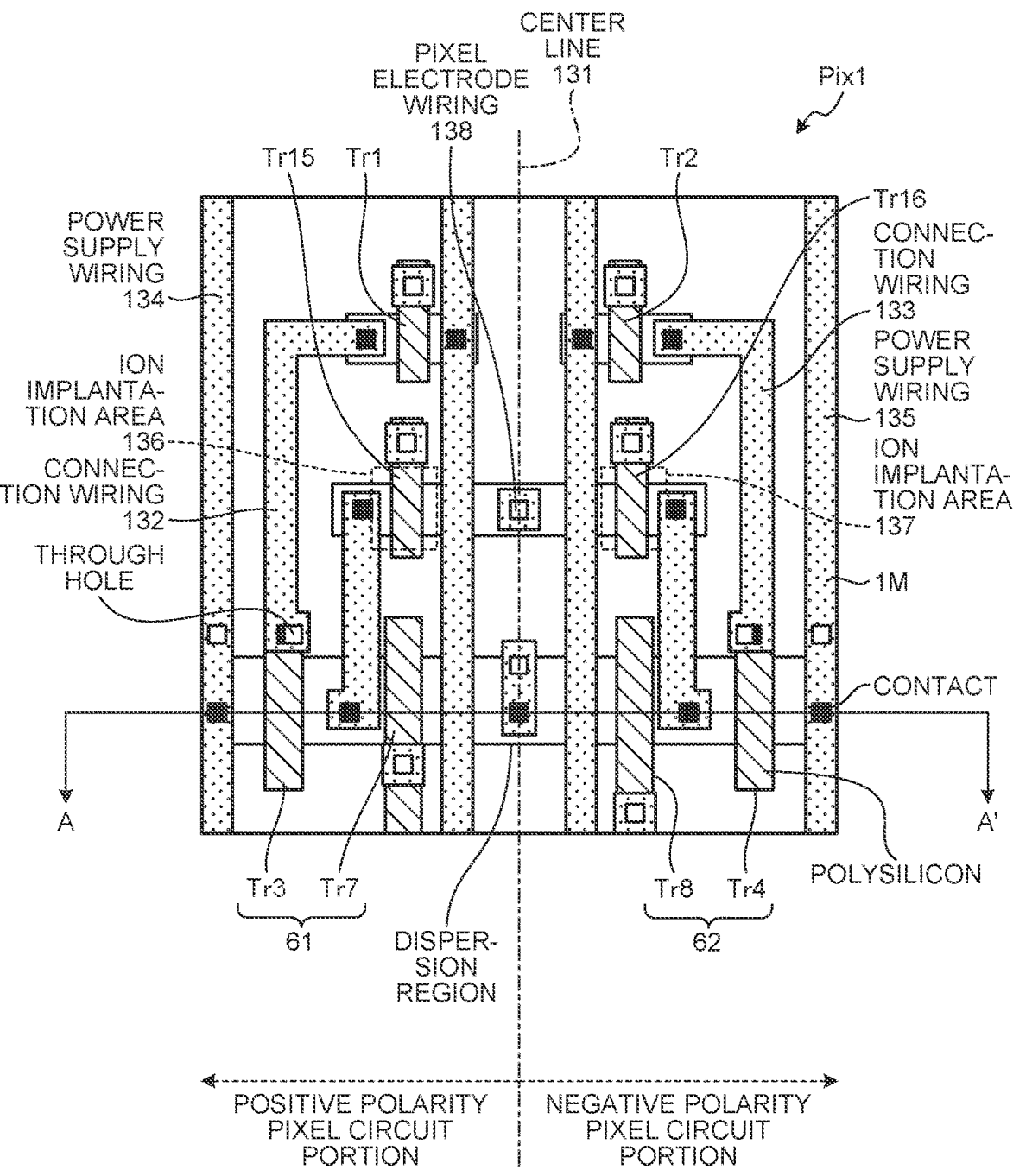
FIG. 18 is a planar layout diagram of a pixel of a reflective liquid crystal display device of a seventh embodiment.
Figure 19:
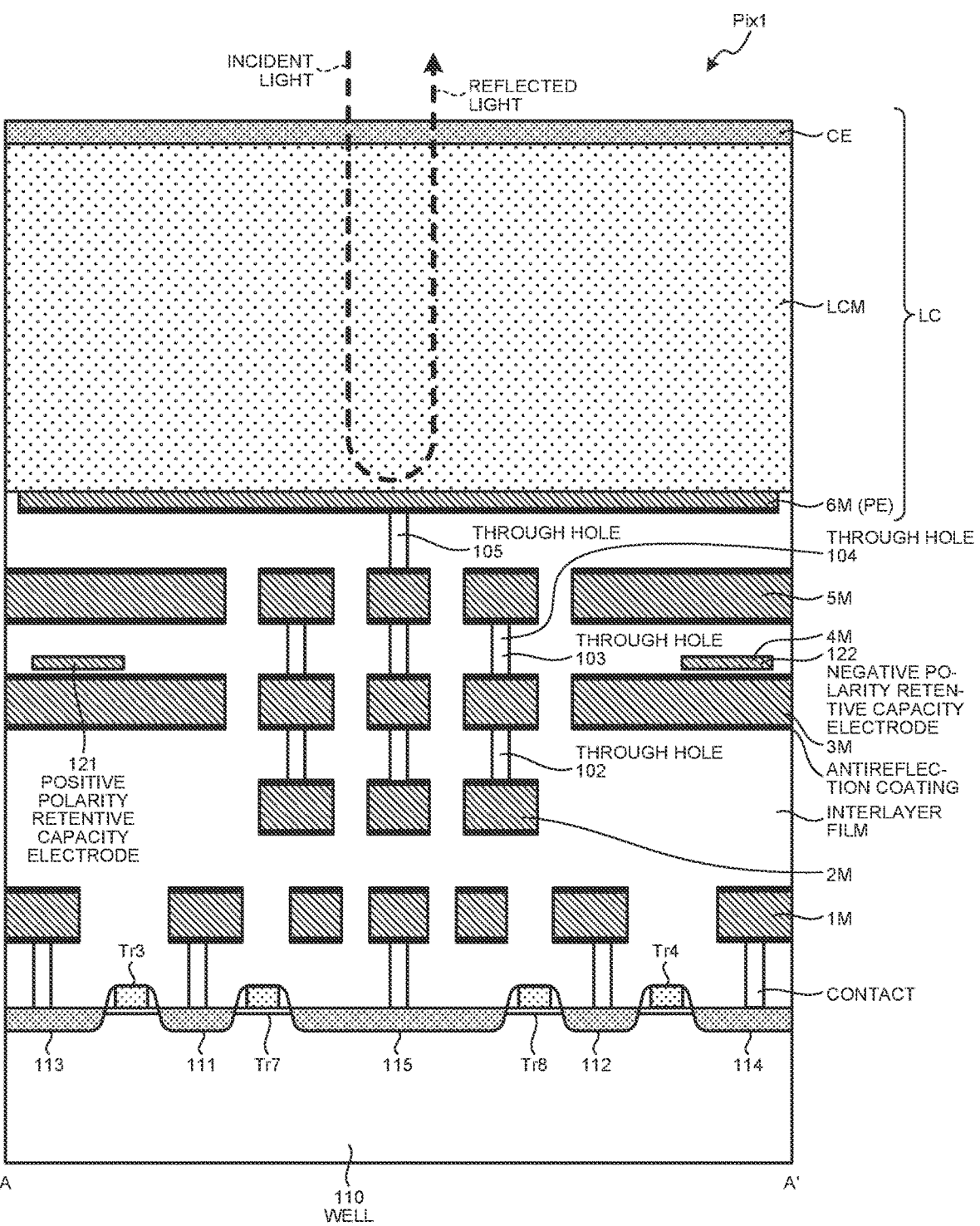
FIG. 19 is a sectional view of the pixel of the reflective liquid crystal display device of the seventh embodiment.

FIG. 18 is a planar layout diagram of a pixel of a reflective liquid crystal display device of a seventh embodiment. FIG. 19 is a sectional view of the pixel of the reflective liquid crystal display device of the seventh embodiment. More particularly, FIG. 18 is a planar layout diagram illustrating the transistors of the pixel Pix1 (the second embodiment), a first metal layer 1M, contacts connecting between the transistors and the first metal layer 1M, and through holes (102 to 105) connecting between the first metal layer 1M and a second metal layer 2M. FIG. 19 is a sectional view upon an A-A' line in FIG. 18.

For components of a pixel Pix1 of the reflective liquid crystal display device of the seventh (second) embodiment, the same reference signs will be assigned to the components that are the same as those of the pixel Pix of the comparative example or the pixels Pix2 to Pixy of the third to sixth embodiments, and description thereof will be omitted.

A cross-sectional structure of the pixel Pix1 will be described first by reference to FIG. 19.

The pixel Pix1 has a structure in which the first metal layer 1M, the second metal layer 2M, a third metal layer 3M, a fourth metal layer 4M, a fifth metal layer 5M, and a sixth metal layer 6M are layered over upper layers of the transistors formed on a well 110 of a semiconductor substrate with interlayer films interposed between these metal layers. Furthermore, the sixth metal layer 6M is a part of the pixel electrode PE, and the common electrode CE is formed at a position opposite to and separate from the pixel electrode PE. A liquid crystal display body (a liquid crystal layer) LCM is held between the pixel electrode PE and the common electrode CE to form a liquid crystal display element LC.

In the pixel Pix1, A pair of circuit components and wirings in a positive polarity pixel circuit portion and those in a negative polarity pixel circuit portion are arranged to be line symmetric. In other words, the pair of the circuit components and the wirings are arranged in a mirror-inverted manner.

In the pixel Pix1 (see FIG. 8), the positive polarity pixel circuit portion includes the transistors Tr1, Tr3, Tr7, and Tr15, the holding capacitor Cs1, and the pixel data line Di+. Furthermore, in the pixel Pix1, the negative polarity pixel circuit portion includes the transistors Tr2, Tr4, Tr8, and Tr16, the holding capacitor Cs2, and the pixel data line Di−. However, the transistors Tr1 to Tr4, Tr7, Tr8, Tr15, and Tr16 are formed on the well that is a semiconductor substrate, and the circuit components except the transistors and the wirings are arranged on the first metal layer 1M to the sixth metal layer 6M.

On the well 110, gates of the transistors Tr3 and Tr7, and gates of the transistors Tr4 and Tr8 are arranged and formed symmetrically to each other. These gate electrodes are formed of polysilicon.

Furthermore, on the well 110, a diffusion layer 111 serving as a source of the transistor Tr3 and a drain of the transistor Tr7 is formed between the gate of the transistor Tr3 and the gate of the transistor Tr7. Furthermore, a diffusion layer 112 serving as a source of the transistor Tr4 and a drain of the transistor Tr8 is formed between the gate of the transistor Tr4 and the gate of the transistor Tr8. Furthermore, on the well 110, a diffusion layer 113 serving as a drain of the transistor Tr3, a diffusion layer 114 serving as a drain of the transistor Tr4, and a diffusion layer 115 serving as a source of the transistor Tr7 and a source of the transistor Tr8 are formed. Some parts of the diffusion layers 111 to 115 are electrically connected to a pixel electrode wiring 138 (see FIG. 18) of the first metal layer 1M via the contacts and the through holes. Furthermore, other parts of the diffusion layers 111 to 115 are electrically connected to a reference potential wiring VSS of the first metal layer 1M.

In FIG. 19, antireflection coatings represented by bold solid lines are formed on upper surfaces and lower surfaces of the first metal layer 1M, the second metal layer 2M, the third metal layer 3M, and the fifth metal layer 5M, and a lower surface of the sixth metal layer 6M. These antireflection coatings are formed of metallic films of Ti or TiN, for example, and function as part of the metal layers. While absorbing some part of light coming from gaps in the pixel electrode PE, the antireflection coatings reflect other part of light which the antireflection coatings cannot absorb. Therefore, in this structure, the longer an optical path length of reflected light is (the more repeated reflection is), the more the reflected light is attenuated.

A positive polarity holding capacitor electrode 121 that is a high potential side electrode of the holding capacitor Cs1, a negative polarity holding capacitor electrode 122 that is a high potential side electrode of the holding capacitor Cs2, and a holding capacitor electrode of a pixel electrode not illustrated in the drawings are formed on the fourth metal layer 4M. The holding capacitor electrode of the pixel electrode is formed to be connected to the sixth metal layer 6M (the pixel electrode PE) via through holes 104 and 105.

A planar layout of the pixel Pix1 will be described next by reference to FIG. 18.

Each of the transistors is formed of layers including an active region and polysilicon, for example, and is connected to a first metal layer 1M wiring via the contact as required. In FIG. 18, the transistor Tr2 is a switching transistor for writing a negative polarity pixel signal, and the transistor Tr1 is a switching transistor for writing a positive polarity pixel signal. The transistors Tr1 and transistor Tr2 are formed in a laterally mirror-inverted manner with reference to a center line 131 in one pixel.

Furthermore, the source follower circuit 61 (consisting of the transistor Tr3 and transistor Tr7) and the source follower circuit 62 (consisting of the transistor Tr4 and transistor Tr8) are formed in a laterally mirror-inverted manner with reference to the center line 131.

A connection wiring 133 is connected to a source of the transistor Tr2, the gate of the transistor Tr4, and the holding capacitor Cs2. A connection wiring 132 is connected to a source of the transistor Tr1, the gate of the transistor Tr3, and the holding capacitor Cs1. The connection wiring 133 and the connection wiring 132 are formed in a laterally mirror-inverted manner. The gate electrode of the transistor Tr15 that performs switching of a positive polarity pixel signal and the gate electrode of the transistor Tr16 that performs switching of a negative polarity pixel signal are independent of each other. The gate electrode of the transistor Tr15 and the gate electrode of the transistor Tr16 are respectively connected to the wiring S+ and the wiring S− that are arranged along a row direction for the pixels of the same row.

The contacts not illustrated in the drawings are also arranged at the through holes illustrated at the gates of the transistors Tr1, Tr2, Tr7, Tr8, Tr15, and Tr16 and at the drains of the transistors Tr7 and Tr8. Therefore, the gates of the transistors Tr1, Tr2, Tr7, Tr8, Tr15, and Tr16 and the drains of the transistors Tr7 and Tr8 are connected to the second metal layer 2M via the contacts and the through holes.

A power supply wiring 134 and a power supply wiring 135 that supply a power supply voltage VDD are arranged at both left and right ends of one pixel, and are arranged to serve as a guard pattern to minimize cross talk from the connection wiring 132 or 133 formed of the first metal layers 1M of adjacent pixels on both left and right ends thereof. The holding capacitor Cs1 and the holding capacitor Cs2 thereby can hold a stable voltage without being affected by an unnecessary voltage. Furthermore, each of the power supply wirings 134 and 135 is also used as a wiring to connect a power supply voltage VDD potential to pixels overlapped in the vertical direction.

As described already, the transistors Tr15 and Tr16 are low Vth NMOS transistors. Ions are implanted into ion implantation areas 136 and 137 of the transistors Tr15 and Tr16 so that the transistors Tr15 and Tr16 have a threshold voltage Vth different from those of other ordinary NMOS transistors. Practically, a mask having a pattern of the ion implantation areas 136 and 137 is formed. Ions that have passed through the mask are implanted into active regions under the gates of the transistors Tr15 and Tr16. The transistors Tr15 and Tr16 are thereby adjusted to have a desired threshold voltage Vth. Ions are implanted in the pixel Pix1 so that the transistors Tr15 and Tr16 have a threshold voltage Vth of 0.4 V.

Since a method of making the pixel Pix2 of the third embodiment is similar to the method of making the pixel Pix1, description thereof will thus be omitted. Ions are implanted into ion implantation areas 136 and 137 of the transistors Tr25 and Tr26 in the pixel Pix2 so that the transistors Tr25 and Tr26 become depression transistors. Ions are implanted in the pixel Pix2 so that the transistors Tr25 and Tr26 have a threshold voltage Vth of −0.9 V.

Eighth Embodiment

Figure 20:
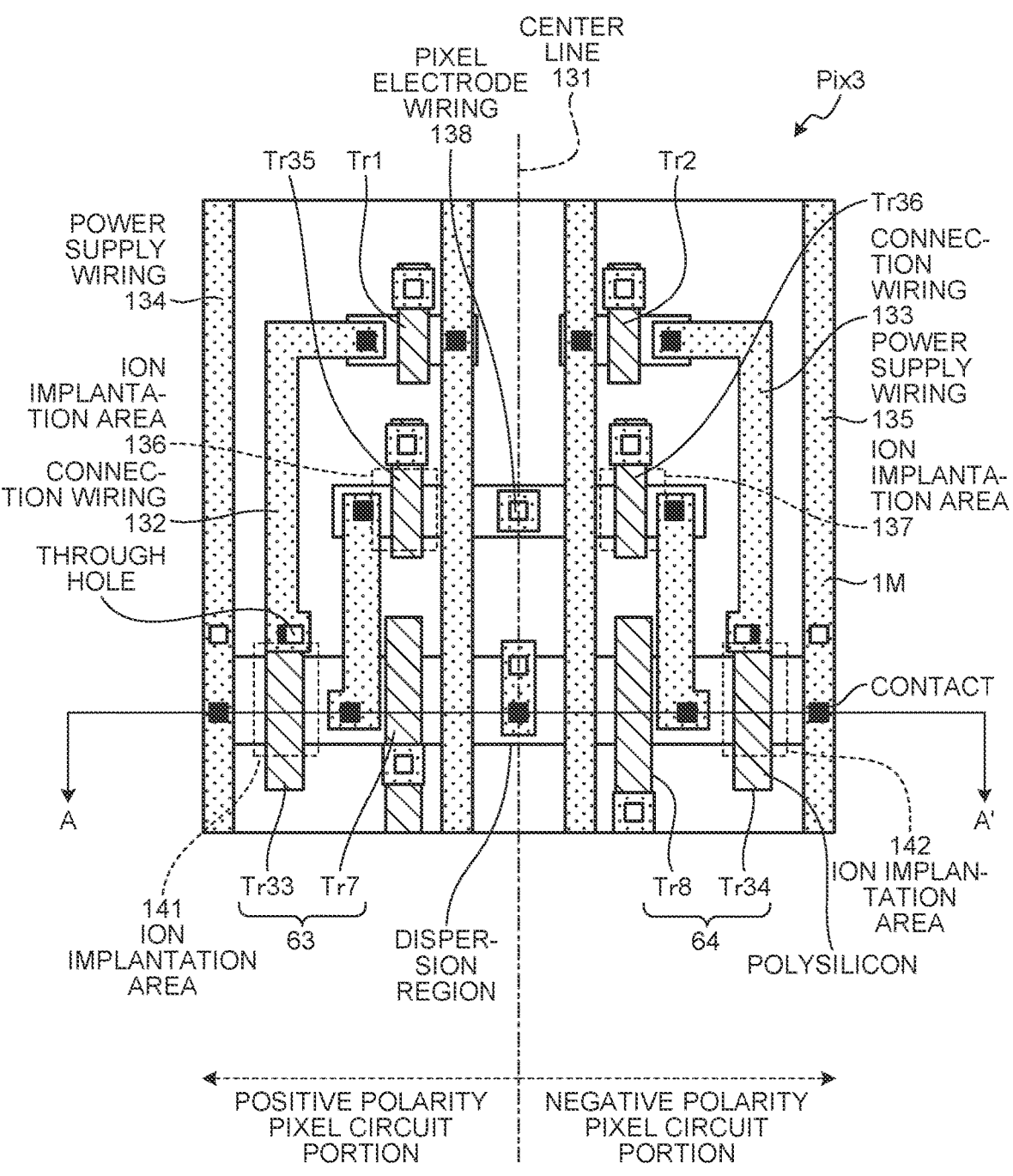
FIG. 20 is a planar layout diagram of a pixel of a reflective liquid crystal display device of an eighth embodiment.

FIG. 20 is a planar layout diagram of a pixel of a reflective liquid crystal display device of an eighth embodiment. More particularly, FIG. 20 is a planar layout diagram illustrating the transistors of the pixel Pix3 (the fourth embodiment), a first metal layer 1M, contacts connecting between the transistors and the first metal layer 1M, and through holes connecting between the first metal layer 1M and a second metal layer 2M.

For components of a pixel Pix3 of the reflective liquid crystal display device of the eighth (fourth) embodiment, the same reference signs will be assigned to the components that are the same as those of the pixel Pix of the comparative example or the pixels Pix1, Pix2, Pix4, and Pixy of the second, third, and fifth to seventh embodiments, and description thereof will be omitted.

Each of the transistors is formed of layers including an active region and polysilicon, for example, and is connected to the first metal layer 1M wiring via the contact as required. In FIG. 20, the transistor Tr2 is a switching transistor for writing a negative polarity pixel signal, and the transistor Tr1 is a switching transistor for writing a positive polarity pixel signal. The transistor Tr1 and transistor Tr2 are formed in a laterally mirror-inverted manner with reference to a center line 131 in one pixel.

Furthermore, the source follower circuit 63 (consisting of the transistor Tr33 and the transistor Tr7) and the source follower circuit 64 (consisting of the transistor Tr34 and the transistor Tr8) are formed in a laterally mirror-inverted manner with reference to the center line 131.

A connection wiring 133 is connected to the source of the transistor Tr2, the gate of the transistor Tr4, and the holding capacitor Cs2. A connection wiring 132 is connected to the source of the transistor Tr1, the gate of the transistor Tr3, and the holding capacitor Cs1. The connection wiring 133 and the connection wiring 132 are formed in a laterally mirror-inverted manner. The gate electrode of the transistor Tr35 that performs switching of a positive polarity pixel signal and the gate electrode of the transistor Tr36 that performs switching of a negative polarity pixel signal are independent of each other. The gate electrode of the transistor Tr35 and the gate electrode of the transistor Tr36 are respectively connected to the wiring S+ and the wiring S− that are arranged along a row direction for the pixels of the same row.

The contacts not illustrated in the drawings are also arranged at the through holes illustrated at the gates of the transistors Tr1, Tr2, Tr7, Tr8, Tr35, and Tr36 and at the drains of the transistors Tr7 and Tr8. Therefore, the gates of the transistors Tr1, Tr2, Tr7, Tr8, Tr35, and Tr36 and the drains of the transistors Tr7 and Tr8 are connected to the second metal layer 2M via the contacts and the through holes.

A power supply wiring 134 and a power supply wiring 135 that supply a power supply voltage VDD are arranged at both left and right ends of one pixel, and are arranged to serve as a guard pattern to minimize cross talk from the connection wiring 132 or 133 formed of the first metal layers 1M of adjacent pixels on both left and right ends thereof. The holding capacitor Cs1 and the holding capacitor Cs2 are thereby can hold a stable voltage without being affected by an unnecessary voltage. Furthermore, each of the power supply wiring 134 and the power supply wiring 135 is also used as a wiring to connect a power supply voltage VDD potential to pixels overlapped in the vertical direction.

As described already, the transistors Tr35 and Tr36 are depression NMOS transistors. Ions are implanted into ion implantation areas 136 and 137 of the transistors Tr35 and Tr36 so that the transistors Tr35 and Tr36 have a threshold voltage Vth different from those of other ordinary NMOS transistors. Practically, a mask having a pattern of the ion implantation areas 136 and 137 is formed. Ions that have passed through the mask are implanted into active regions under the gates of the transistors Tr35 and Tr36. The transistors Tr35 and Tr36 are thereby adjusted to have a desired threshold voltage Vth. Ions are implanted in the pixel Pix3 so that the transistors Tr35 and Tr36 have a threshold voltage Vth of 0 V.

Furthermore, as described already, the transistors Tr33 and Tr34 are depression PMOS transistors. Ions are implanted into ion implantation areas 141 and 142 of the transistors Tr33 and Tr34 so that the transistors Tr33 and Tr34 have a threshold voltage Vth different from those of other ordinary PMOS transistors. Practically, a mask having a pattern of the ion implantation areas 141 and 142 is formed. Ions that have passed through the mask are then implanted into active regions under the gates of the transistors Tr33 and Tr34. The transistors Tr33 and Tr34 are thereby adjusted to have a desired threshold voltage Vth. Ions are implanted in the pixel Pix3 so that the transistors Tr33 and Tr34 have a threshold voltage Vth of +0.4 V.

Ions are implanted into the ion implantation areas 136 and 137 by use of a first mask having a pattern for NMOS transistors and ions are implanted into the ion implantation areas 141 and 142 by use of a second mask having a pattern for PMOS transistors. Therefore, the mask for the ion implantation areas 136 and 137 and the mask for the ion implantation areas 141 and 142 are different masks.

Ninth Embodiment

Figure 21:
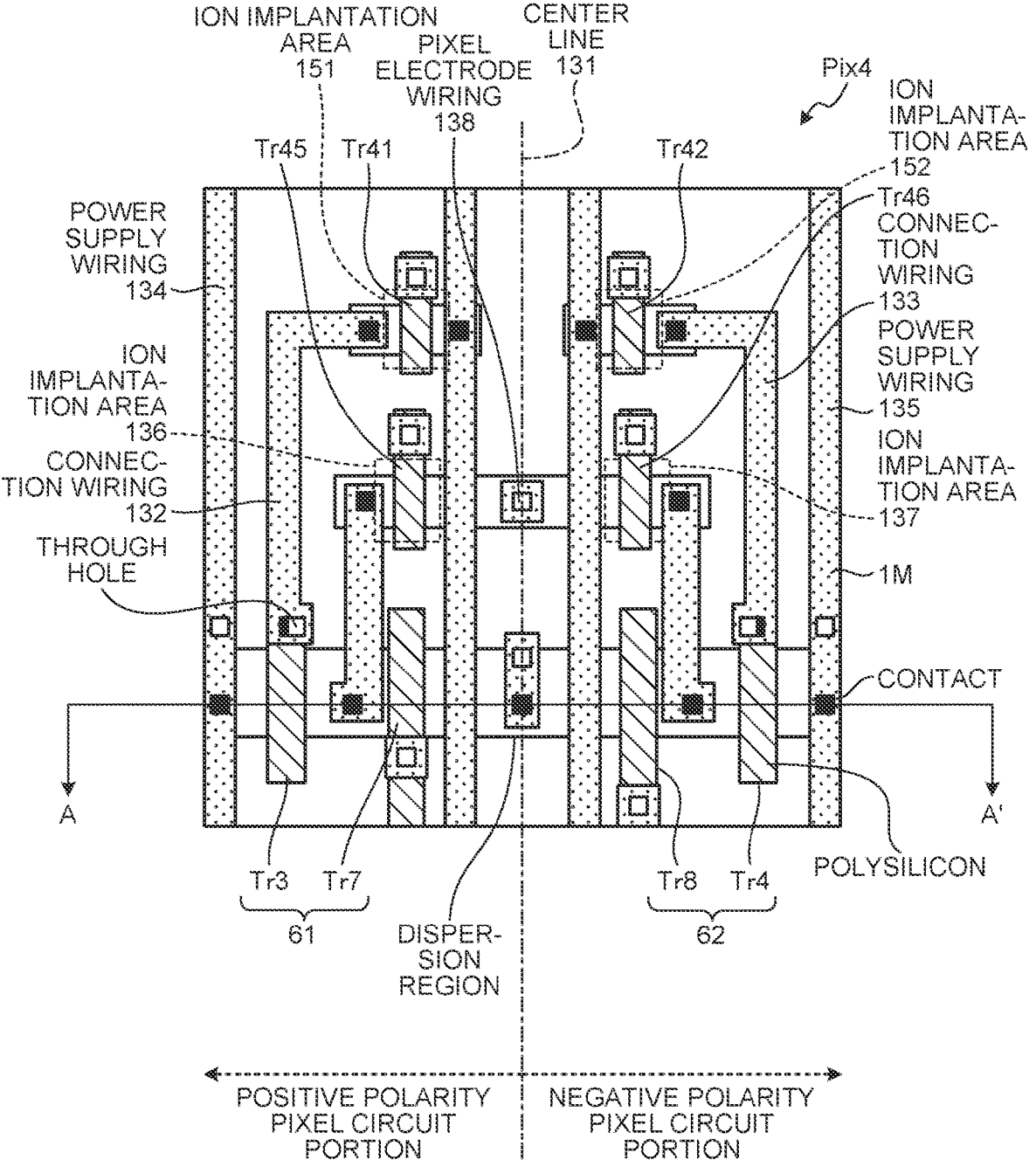
FIG. 21 is a planar layout diagram of a pixel of a reflective liquid crystal display device of a ninth embodiment.

FIG. 21 is a planar layout diagram of a pixel of a reflective liquid crystal display device of a ninth embodiment. More particularly, FIG. 21 is a planar layout diagram illustrating the transistors of the pixel Pix4 (the fifth embodiment), a first metal layer 1M, contacts connecting between the transistors and the first metal layer 1M, and through holes connecting between the first metal layer 1M and a second metal layer 2M.

For components of a pixel Pix4 of the reflective liquid crystal display device of the ninth (fifth) embodiment, the same reference signs will be assigned to the components that are the same as those of the pixel Pix of the comparative example or the pixels Pix1, Pix2, Pix3, and Pixy of the second to fourth and sixth to eighth embodiments, and description thereof will be omitted.

Each of the transistors is formed of layers including an active region and polysilicon, for example, and is connected to the first metal layer 1M via the contact as required. In FIG. 21, the transistor Tr42 is a switching transistor for writing a negative polarity pixel signal, and the transistor Tr41 is a switching transistor for writing a positive polarity pixel signal. The transistor Tr41 and transistor Tr42 are formed in a laterally mirror-inverted manner with reference to a center line 131 in one pixel.

Furthermore, the source follower circuit 61 (consisting of the transistor Tr3 and the transistor Tr7) and the source follower circuit 62 (consisting of the transistor Tr4 and the transistor Tr8) are formed in a laterally mirror-inverted manner with reference to the center line 131.

A connection wiring 133 is connected to the source of the transistor Tr42, the gate of the transistor Tr4, and the holding capacitor Cs2. A connection wiring 132 is connected to the source of the transistor Tr41, the gate of the transistor Tr3, and the holding capacitor Cs1. The connection wiring 133 and the connection wiring 132 are formed in a laterally mirror-inverted manner. The gate electrode of the transistor Tr45 that performs switching of a positive polarity pixel signal and the gate electrode of the transistor Tr46 that performs switching of a negative polarity pixel signal are independent of each other. The gate electrode of the transistor Tr45 and the gate electrode of the transistor Tr46 are respectively connected to the wiring S+ and the wiring S− that are arranged along a row direction for the pixels of the same row.

The contacts not illustrated in the drawings are arranged at the through holes illustrated at the gates of the transistors Tr7, Tr8, Tr41, Tr42, Tr45, and Tr46 and at the drains of the transistors Tr7 and Tr8. Therefore, the gates of the transistors Tr7, Tr8, Tr41, Tr42, Tr45, and Tr46 and the drains of the transistors Tr7 and Tr8 are connected to the second metal layer 2M via the contacts and the through holes.

A power supply wiring 134 and a power supply wiring 135 that supply a power supply voltage VDD are arranged at both left and right ends of one pixel, and are arranged to serve as a guard pattern to minimize cross talk from the connection wiring 132 or 133 formed of the first metal layers 1M of adjacent pixels on both left and right ends thereof. The holding capacitor Cs1 and the holding capacitor Cs2 thereby can hold a stable voltage without being affected by an unnecessary voltage. Furthermore, each of the power supply wiring 134 and the power supply wiring 135 is also used as a wiring to connect a power supply voltage VDD potential to pixels overlapped in the vertical direction.

As described already, the transistors Tr41, Tr42, Tr45, and Tr46 are low Vth NMOS transistors. Ions are implanted into ion implantation areas 136 and 137 of the transistors Tr45 and Tr46 and ion implantation areas 151 and 152 of the transistors Tr41 and Tr42 so that the transistors Tr45, Tr46, Tr41, and Tr42 have a threshold voltage Vth different from those of other ordinary NMOS transistors. Practically, one mask having a combination of patterns of the ion implantation areas 136, 137, 151, and 152 is formed. Ions that have passed through the mask are then implanted into active regions under the gates of the transistors Tr41, Tr42, Tr45, and Tr46. The transistors Tr41, Tr42, Tr45, and Tr46 are thereby adjusted to have a desired threshold voltage Vth. Ions are implanted in the pixel Pix4 so that the transistors Tr41, Tr42, Tr45, and Tr46 have a threshold voltage Vth of +0.4 V.

The case in which the threshold voltage Vth of the transistors Tr41 and Tr42 and the threshold voltage Vth of the transistors Tr45 and Tr46 are the same has been described above. In a case in which the threshold voltage Vth of the transistors Tr41 and Tr42 and the threshold voltage Vth of the transistors Tr45 and Tr46 are different from each other, a first mask for the ion implantation areas 136 and 137 and a second mask for the ion implantation areas 151 and 152 are different masks. Ions are then implanted so that each of the threshold voltage Vth of the transistors Tr41 and Tr42 and the threshold voltage Vth of the transistors Tr45 and Tr46 becomes a desired threshold voltage Vth.

Tenth Embodiment

Figure 22:
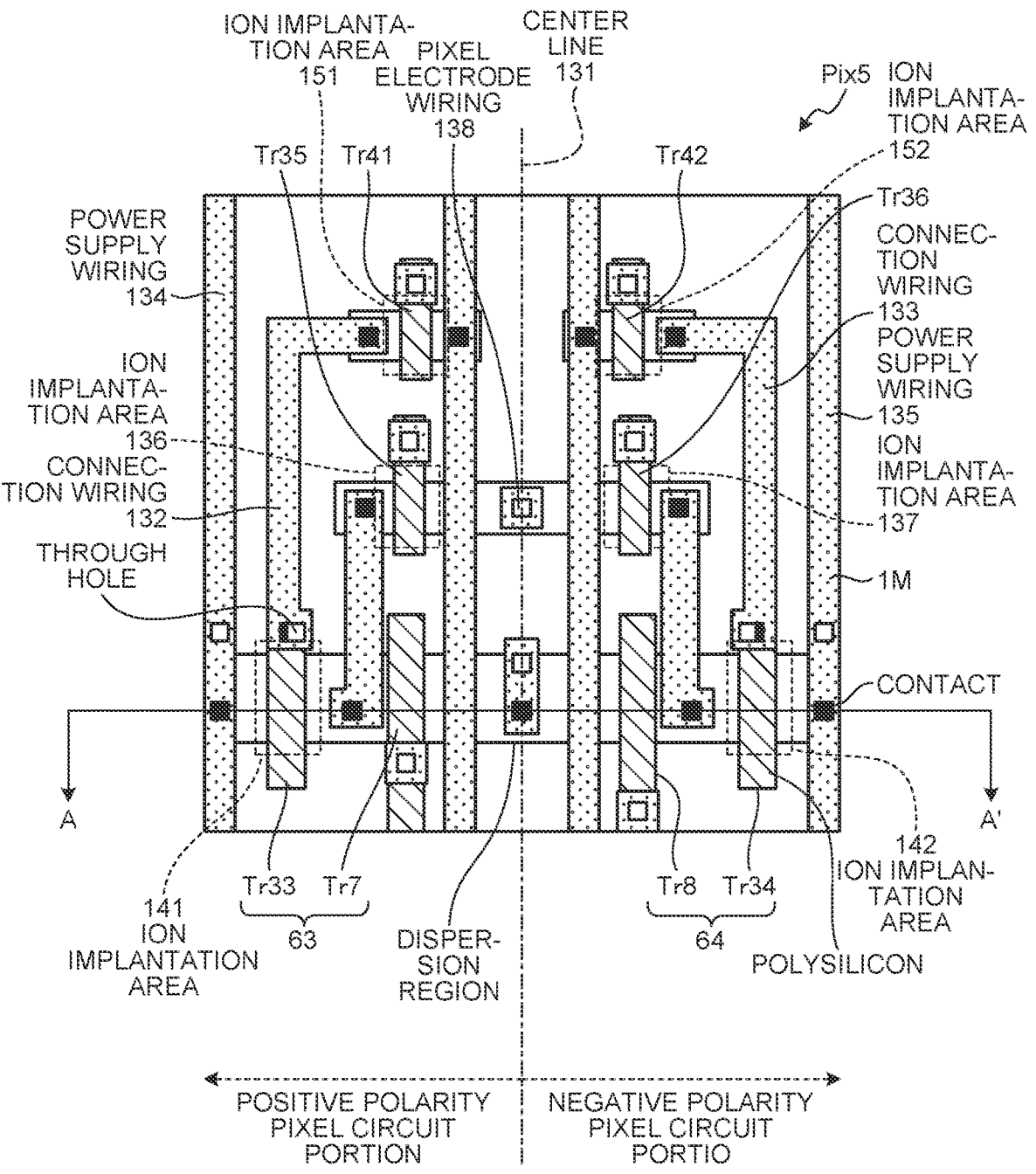
FIG. 22 is a planar layout diagram of a pixel of a reflective liquid crystal display device of a tenth embodiment.

FIG. 22 is a planar layout diagram of a pixel of a reflective liquid crystal display device of a tenth embodiment. More particularly, FIG. 22 is a planar layout diagram illustrating the transistors of the pixel Pix5 (the sixth embodiment), a first metal layer 1M, contacts connecting between the transistors and the first metal layer 1M, and through holes connecting between the first metal layer 1M and a second metal layer 2M.

For components of a pixel Pix5 of the reflective liquid crystal display device of the tenth (sixth) embodiment, the same reference signs will be assigned to the components that are the same as those of the pixel Pix of the comparative example or the pixels Pix1 to Pix4 of the second to fifth and seventh to ninth embodiments, and description thereof will be omitted.

Each of the transistors is formed of layers including an active region and polysilicon, for example, and is connected to a first metal layer 1M wiring via the contact as required. In FIG. 22, the transistor Tr42 is a switching transistor for writing a negative polarity pixel signal, and the transistor Tr41 is a switching transistor for writing a positive polarity pixel signal. The transistor Tr41 and transistor Tr42 are formed in a laterally mirror-inverted manner with reference to a center line 131 in one pixel.

Furthermore, the source follower circuit 63 (consisting of the transistor Tr33 and the transistor Tr7) and the source follower circuit 64 (consisting of the transistor Tr34 and the transistor Tr8) are formed in a laterally mirror-inverted manner with reference to the center line 131.

A connection wiring 133 is connected to the source of the transistor Tr42, the gate of the transistor Tr34, and the holding capacitor Cs2. A connection wiring 132 is connected to the source of the transistor Tr41, the gate of the transistor Tr33, and the holding capacitor Cs1. The connection wiring 133 and the connection wiring 132 are formed in a laterally mirror-inverted manner. The gate electrode of the transistor Tr35 that implements switching of a positive polarity pixel signal and the gate electrode of the transistor Tr36 that implements switching of a negative polarity pixel signal are independent of each other. The gate electrode of the transistor Tr35 and the gate electrode of the transistor Tr36 are respectively connected to the wiring S+ and the wiring S− that are arranged along a row direction for the pixels of the same row.

The contacts not illustrated in the drawings are arranged at the through holes illustrated at the gates of the transistors Tr7, Tr8, Tr41, Tr42, Tr35, and Tr36 and at the drains of the transistors Tr7 and Tr8. Therefore, the gates of the transistors Tr7, Tr8, Tr41, Tr42, Tr35, and Tr36 and the drains of transistors Tr7 and Tr8 are connected to the second metal layer 2M via the contacts and the through holes.

A power supply wiring 134 and a power supply wiring 135 that supply a power supply voltage VDD are arranged at both left and right ends of one pixel, and are arranged to serve as a guard pattern to minimize cross talk from the connection wiring 132 or 133 formed of the first metal layers 1M of adjacent pixels on both left and right ends thereof. The holding capacitor Cs1 and the holding capacitor Cs2 thereby can hold a stable voltage without being affected by an unnecessary voltage. Furthermore, each of the power supply wiring 134 and a power supply wiring 135 is also used as a wiring to connect a power supply voltage VDD potential to pixels overlapped in the vertical direction.

As described already, the transistors Tr35 and Tr36 are depression NMOS transistors. Ions are implanted into ion implantation areas 136 and 137 of the transistors Tr35 and Tr36 so that the transistors Tr35 and Tr36 have a threshold voltage Vth different from those of other ordinary NMOS transistors. Practically, a mask having a pattern of the ion implantation areas 136 and 137 is formed. Ions that have passed through the mask are then implanted into active regions under the gates of the transistors Tr35 and Tr36. The transistors Tr35 and Tr36 are thereby adjusted to have a desired threshold voltage Vth. Ions are implanted in the pixel Pix5 so that the transistors Tr35 and Tr36 have a threshold voltage Vth of 0 V.

Furthermore, as described already, the transistors Tr41 and Tr42 are low Vth NMOS transistors. Ions are implanted into ion implantation areas 151 and 152 of the transistors Tr41 and Tr42 so that the transistors Tr41 and Tr42 have a threshold voltage Vth different from those of other ordinary NMOS transistors. Practically, a mask having a pattern of the ion implantation areas 151 and 152 is formed. Ions that have passed through the mask are then implanted into active regions under the gates of the transistors Tr41 and Tr42. The transistors Tr41 and Tr42 are thereby adjusted to have a desired threshold voltage Vth. Ions are implanted in the pixel Pix5 so that the transistors Tr41 and Tr42 have a threshold voltage Vth of +0.4 V.

Furthermore, as described already, the transistors Tr33 and Tr34 are depression PMOS transistors. Ions are implanted into ion implantation areas 141 and 142 of the transistors Tr33 and Tr34 so that the transistors Tr33 and Tr34 have a threshold voltage Vth different from those of other ordinary PMOS transistors. Practically, a mask having a pattern of the ion implantation areas 141 and 142 is formed. Ions that have passed through the mask are then implanted into active regions under the gates of the transistors Tr33 and Tr34. The transistors Tr33 and Tr34 are thereby adjusted to have a desired threshold voltage Vth. Ions are implanted in the pixel Pix5 so that the transistors Tr33 and Tr34 have a threshold voltage Vth of +0.4 V.

The transistors Tr41 and Tr42 are low Vth NMOS transistors, and the transistors Tr35 and Tr36 are depression NMOS transistors. Furthermore, the transistors Tr33 and Tr34 are depression PMOS transistors. Therefore, the first mask having the pattern of the ion implantation areas 136 and 137, the second mask having the pattern of the ion implantation areas 141 and 142, and a third mask having the pattern of the ion implantation areas 151 and 152 are different masks.

Furthermore, in the pixel Pix5, the transistors Tr41 and Tr42 are low Vth NMOS transistors and the transistors Tr35 and Tr36 are depression NMOS transistors. Each of the transistors Tr41, Tr42, Tr35, and Tr36 is an NMOS transistor, but has a different threshold voltage Vth. This configuration makes manufacturing complicated, and thus the threshold voltages Vth of the transistors Tr41, Tr42, Tr35, and Tr36 may be unified to the same voltage while giving priority to cost. In this case, one mask having a combination of the patterns of the ion implantation areas 151 and 152 and the ion implantation areas 136 and 137 is formed. Ions are then implanted into the active regions under the gates of the transistors Tr41, Tr42, Tr35, and Tr36. The transistors Tr41, Tr42, Tr35, and Tr36 are thereby adjusted to have a desired threshold voltage Vth.

Notes

Each of the transistors in a portion (a frame portion) 13*a*, in which the multiple wavelength channels that have been diffused are not incident, on the pixels of the reflective liquid crystal display device 13 illustrated in FIG. 3 is preferably a transistor having an ordinary threshold voltage Vth, instead of a low Vth or depression transistor. Thus in the reflective liquid crystal display device 13, the leakage current at the portion 13*a* is suppressed and power consumption can be suppressed.

The technical scope of embodiments are not limited to the embodiments described above and modifications may be made as appropriate without departing from the gist of the embodiments.

The optical node device of the embodiments can be used in, for example, an optical network.

According to aspects of the present application, the dynamic range of the optical node device can be expanded.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. An optical node device, comprising:

a liquid crystal display device;

an input and output unit having an input port on which incident light is incident and an output port from which output light according to each wavelength included in the incident light is output;

a dispersive element configured to spatially disperse light of each wavelength included in the incident light according to the wavelength and output the output light toward the input and output unit; and a lens configured to condense the light of each wavelength dispersed by the dispersive element onto a predetermined portion of a surface of the liquid crystal display device per wavelength and output light of each wavelength reflected by the liquid crystal display device toward the dispersive element, wherein the liquid crystal display device has multiple pixels respectively provided at intersections at which multiple pairs of pixel data lines comprising of a positive polarity pixel data line to which a positive polarity pixel signal is supplied and a negative polarity pixel data line to which a negative polarity pixel signal is supplied and multiple row scan lines to which a row scan signal is supplied intersect, each of the multiple pixels comprising:

a display element having a liquid crystal layer held between a pixel electrode and a common electrode that are opposite to each other;

a first holding capacitor for holding the positive polarity pixel signal;

a first transistor having a source-drain path connected between the positive polarity pixel data line and the first holding capacitor and a gate to which the row scan signal is supplied;

a second holding capacitor for holding the negative polarity pixel signal;

a second transistor having a source-drain path connected between the negative polarity pixel data line and the second holding capacitor and a gate to which the row scan signal is supplied;

a first source follower circuit including a third transistor having a gate to which a voltage from the first holding capacitor is input;

a second source follower circuit including a fourth transistor having a gate to which a voltage from the second holding capacitor is input;

a fifth transistor having a source-drain path connected between an output terminal of the first source follower circuit and the pixel electrode and a gate to which a first control signal is supplied; and a sixth transistor having a source-drain path connected between an output terminal of the second source follower circuit and the pixel electrode and a gate to which a second control signal that is turned on alternately with the first control signal is supplied, wherein the first transistor, the second transistor, the fifth transistor, and the sixth transistor are transistors of a first conductivity type, the third transistor and the fourth transistor are transistors of a second conductivity type, the fifth transistor and the sixth transistor are configured to have a second threshold voltage different from a first threshold voltage of the first transistor of the first conductivity type in the predetermined portion and have the first threshold voltage in a portion of the surface other than the predetermined portion, and the light of each wavelength condensed by the lens is reflected in a direction determined by routing per wavelength.

2. The optical node device according to claim 1, wherein the fifth transistor and the sixth transistor are low Vth transistors.

3. The optical node device according to claim 1, wherein the fifth transistor and the sixth transistor are depression transistors.

4. The optical node device according to claim 1, wherein the fifth transistor and the sixth transistor are transistors into which ions for changing the first threshold voltage have been implanted.

5. The optical node device according to claim 1, wherein the fifth transistor and the sixth transistor are N-channel MOS transistors.

* * * * *